United States Patent
Arimura et al.

(10) Patent No.: US 12,362,583 B2
(45) Date of Patent: Jul. 15, 2025

(54) CHARGING CONTROL METHOD, PROGRAM, AND CHARGING CONTROL SYSTEM

(71) Applicant: Panasonic Intellectual Property Management Co., Ltd., Osaka (JP)

(72) Inventors: Koji Arimura, Osaka (JP); Eiji Kawamoto, Osaka (JP); Shimpei Hamaguchi, Osaka (JP); Hideo Morita, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 640 days.

(21) Appl. No.: 17/754,557

(22) PCT Filed: Sep. 23, 2020

(86) PCT No.: PCT/JP2020/035673
§ 371 (c)(1),
(2) Date: Apr. 6, 2022

(87) PCT Pub. No.: WO2021/070605
PCT Pub. Date: Apr. 15, 2021

(65) Prior Publication Data
US 2023/0344258 A1   Oct. 26, 2023

(30) Foreign Application Priority Data
Oct. 7, 2019   (JP) .................. 2019-184814

(51) Int. Cl.
*H02J 7/00* (2006.01)
*B60L 53/62* (2019.01)
*B60L 58/14* (2019.01)

(52) U.S. Cl.
CPC .......... *H02J 7/00712* (2020.01); *B60L 53/62* (2019.02); *H02J 7/00032* (2020.01);
(Continued)

(58) Field of Classification Search
CPC .. H02J 7/00712; H02J 7/00032; H02J 7/0013; H02J 7/0048; B60L 53/62;
(Continued)

(56) References Cited

U.S. PATENT DOCUMENTS 6,498,454 B1 * 12/2002 Pinlam .................. H01M 10/44
320/107
2008/0109114 A1 * 5/2008 Orita .................... H02J 7/00047
901/50
(Continued)

FOREIGN PATENT DOCUMENTS

JP   H06-292303 A   10/1994
JP   2000047728 A * 2/2000
(Continued)

OTHER PUBLICATIONS

Japanese Office Action issued in Japanese Patent Application No. 2021-550639 dated Oct. 31, 2023.
(Continued)

*Primary Examiner* — Richard Isla
*Assistant Examiner* — John Ondrasik
(74) *Attorney, Agent, or Firm* — MCDONALD HOPKINS LLC

(57) ABSTRACT

A charging control method includes setting at least a first threshold value and a second threshold value larger than the first threshold value as threshold values with respect to a remaining capacity of a storage battery unit included in each of a plurality of work devices. The method includes outputting, in a first state where the remaining capacity of the storage battery unit included in a work device designated as
(Continued)

a target of control is equal to or greater than the first threshold value but less than the second threshold value, a charging start instruction to the work device when a predetermined decision condition is satisfied. The method further includes outputting, in a second state where the remaining capacity of the storage battery unit is less than the first threshold value, the charging start instruction to the work device, no matter whether the condition is satisfied or not.

12 Claims, 9 Drawing Sheets

(52) U.S. Cl.
CPC .......... *H02J 7/0013* (2013.01); *H02J 7/0048* (2020.01); *B60L 58/14* (2019.02); *B60L 2200/40* (2013.01)

(58) Field of Classification Search
CPC ...... B60L 58/14; B60L 2200/40; B60L 53/67; B60L 53/68; B60L 58/13; B60L 53/60; Y02T 10/70; Y02T 90/16
USPC .......................................................... 320/149
See application file for complete search history.

(56) References Cited

U.S. PATENT DOCUMENTS

| | | | |
|---|---|---|---|
| 2015/0120045 A1* | 4/2015 | Tan | B63G 8/001 700/250 |
| 2019/0092184 A1 | 3/2019 | Sussman et al. | |
| 2019/0310655 A1* | 10/2019 | Voorhies | G05D 1/0287 |
| 2020/0023999 A1* | 1/2020 | Chae | B60L 53/68 |

FOREIGN PATENT DOCUMENTS

| | | | |
|---|---|---|---|
| JP | 2000-152421 A | | 5/2000 |
| JP | 2010-237924 A | | 10/2010 |
| JP | 2014-150618 A | | 8/2014 |
| JP | 2015-012638 A | | 1/2015 |
| JP | 2019101963 A | * | 6/2019 |
| JP | 6651159 B1 | | 2/2020 |
| WO | 2019/060732 A1 | | 3/2019 |

OTHER PUBLICATIONS

International Search Report issued in Patent Application No. PCT/JP2020/035673 dated Dec. 15, 2020.

* cited by examiner

CHARGING CONTROL METHOD, PROGRAM, AND CHARGING CONTROL SYSTEM

CROSS-REFERENCE TO RELATED APPLICATIONS

This application is a U.S. national stage application of the PCT International Application No. PCT/JP2020/035673 filed on Sep. 23, 2020, which claims the benefit of foreign priority of Japanese Patent Application No. 2019-184814 filed on Oct. 7, 2019, the contents all of which are incorporated herein by reference.

TECHNICAL FIELD

The present disclosure generally relates to a charging control method, a program, and a charging control system. More particularly, the present disclosure relates to a charging control method, a program, and a charging control system, all of which are configured or designed to control charging of a work device that performs specified work.

BACKGROUND ART

Patent Literature 1 discloses a mobile robot charging system including a charger and a charging controller. The charger charges the respective batteries (storage battery units) of a plurality of mobile robots (work devices). The charging controller sets priorities with respect to the plurality of mobile robots according to their remaining capacity. When finding, while the maximum number of mobile robots that can be charged by the charger are being charged, another mobile robot to be newly charged having a higher priority than any of the mobile robots being charged, the charging controller instructs that a mobile robot having the lowest priority, out of the mobile robots being charged, stop being charged. Then, the charging controller makes the mobile robot to be newly charged travel autonomously to the charger to have that mobile robot charged.

In this mobile robot charging system, if the respective remaining capacities of the batteries of a plurality of mobile robots have decreased simultaneously to so low a level as to require charging, then some of those mobile robots may have to wait for their turn to be charged. In other words, those mobile robots cannot be charged immediately. As a result, the remaining capacities of the batteries of those mobile robots could decrease to too low a level for the mobile robots to move any longer.

CITATION LIST

Patent Literature

Patent Literature 1: JP 2010-237924 A

SUMMARY OF INVENTION

It is therefore an object of the present disclosure to provide a charging control method, a program, and a charging control system, all of which are configured or designed to reduce the chances of the storage battery unit having too low a remaining capacity to perform the work.

A charging control method according to an aspect of the present disclosure includes setting processing and charging control processing. The setting processing includes setting at least a first threshold value and a second threshold value as threshold values with respect to a remaining capacity of a storage battery unit included in each of a plurality of work devices. The second threshold value is larger than the first threshold value. The charging control processing includes designating one of the plurality of work devices as a target of control and controlling, based on the remaining capacity of the storage battery unit included in the work device designated as the target of control, charging of the storage battery unit. The charging control processing includes outputting, in a first state where the remaining capacity of the storage battery unit included in the work device designated as the target of control is equal to or greater than the first threshold value but less than the second threshold value, a charging start instruction to the work device designated as the target of control when a predetermined decision condition is satisfied. The charging start instruction is output to instruct the work device designated as the target of control to start charging. The charging control processing further includes outputting, in a second state where the remaining capacity of the storage battery unit included in the work device designated as the target of control is less than the first threshold value, the charging start instruction to the work device designated as the target of control, no matter whether the predetermined decision condition is satisfied or not.

A program according to another aspect of the present disclosure is designed to cause a computer system to perform the charging control method described above.

A charging control system according to still another aspect of the present disclosure includes a setting unit and a charging control unit. The setting unit sets at least a first threshold value and a second threshold value as threshold values with respect to a remaining capacity of a storage battery unit included in each of a plurality of work devices. The second threshold value is larger than the first threshold value. The charging control unit designates one of the plurality of work devices as a target of control and controls, based on the remaining capacity of the storage battery unit included in the work device designated as the target of control, charging of the storage battery unit. The charging control unit outputs, in a first state where the remaining capacity of the storage battery unit included in the work device designated as the target of control is equal to or greater than the first threshold value but less than the second threshold value, a charging start instruction to the work device designated as the target of control when a predetermined decision condition is satisfied. The charging start instruction is output to instruct the work device designated as the target of control to start charging. The charging control unit further outputs, in a second state where the remaining capacity of the storage battery unit included in the work device designated as the target of control is less than the first threshold value, the charging start instruction to the work device designated as the target of control, no matter whether the predetermined decision condition is satisfied or not.

DESCRIPTION OF EMBODIMENTS

Embodiment

A charging control system 1 according to an exemplary embodiment will now be described with reference to FIGS. 1-4.

(1) Overview

Figure 1:
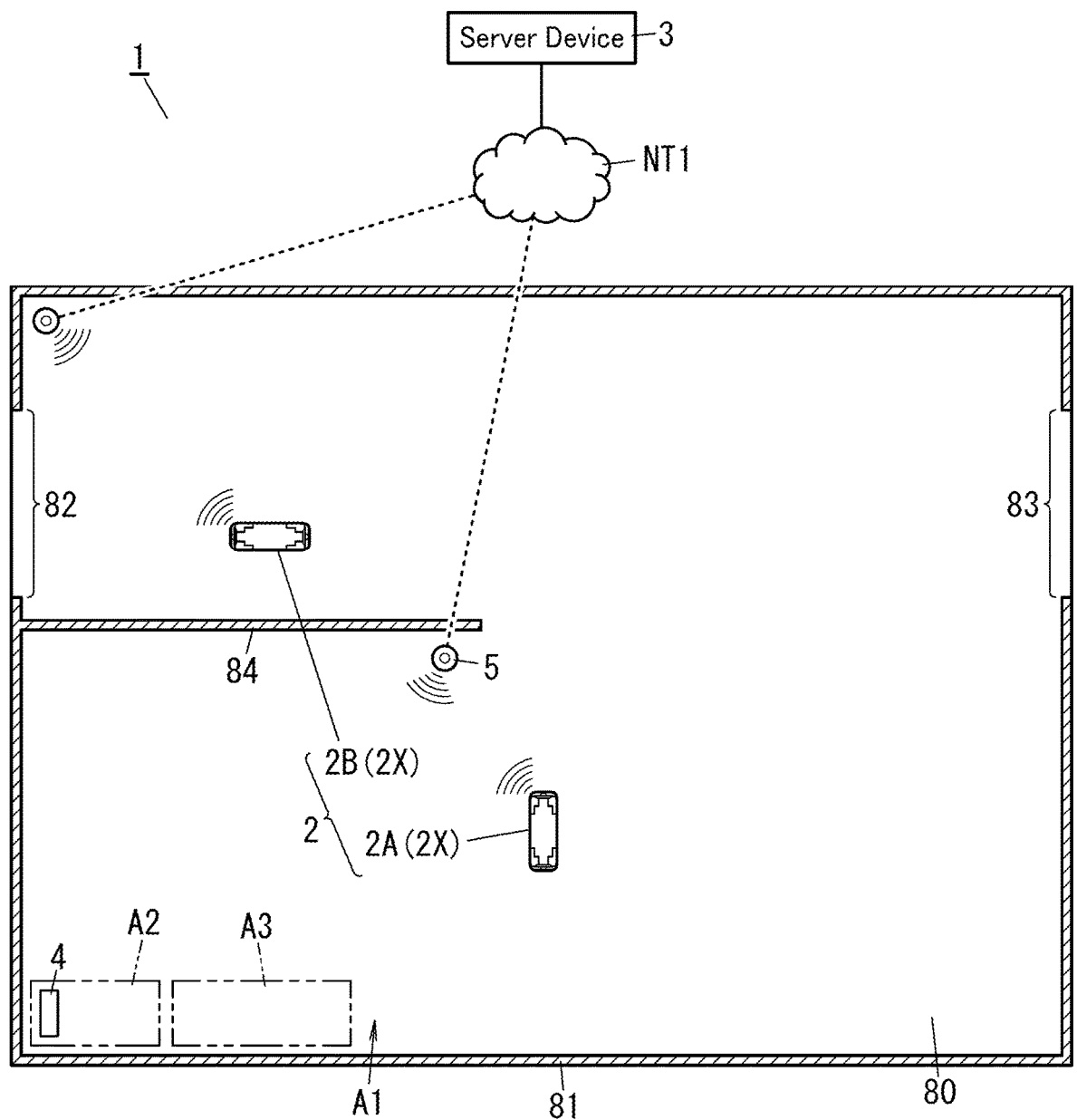
FIG. 1 is a schematic plan view of a working area where a work device designated as a target of control for a charging control system according to an exemplary embodiment of the present disclosure performs specified work.

The charging control system 1 according to this embodiment is a system for controlling charging of a plurality of work devices 2 that perform specified work within a predetermined working area A1 as shown in FIG. 1.

Each of the work devices 2 includes a storage battery unit 24 (see FIG. 2) and performs the specified work by utilizing the electrical energy stored in the storage battery unit 24. In the embodiment to be described below, the work device 2 is a carrier for performing the work of carrying a burden within the working area A1 in accordance with an instruction given by the server device 3. That is to say, the "work" to be performed by the work device 2 is the work of carrying the burden. The carriers of this type may include automated guided vehicles (AGVs), mobile robots, and drones. As used herein, the "mobile robot" refers to any of various types of robots including wheeled robots, crawler robots, and legged robots (including walking robots). The work to be performed by the work device 2 includes not only the work of carrying the burden but also various other types of work including picking, welding, mounting, displaying, greeting customers, security guarding, assembling, and testing.

In the working area A1, placed is a charger 4 for charging the work devices 2 with electricity. In the working area A1, a charging area A2 is defined as an area that no work devices 2 other than the work device 2 being charged by the charger 4 are allowed to enter. In addition, in the working area A1, a charging standby area A3 is also defined adjacent to the charging area A2. The charging standby area A3 allows, while the charger 4 is charging one work device 2, another work device 2 to wait for its turn to come (i.e., wait for the charger 4 to be available for latter work device 2).

In this embodiment, the number of the chargers 4 provided is smaller than the number of the work devices 2 for use within the working area A1. Specifically, in the example illustrated in FIG. 1, one charger 4 is installed for two work devices 2. In other words, the number of the work devices 2 used within the working area A1 is larger than the number of the work devices 2 that can be charged at a time by the charger 4 (hereinafter referred to as the "number of chargeable devices"). Thus, if work devices 2, of which the number is larger than the number of chargeable devices, need to have their storage battery unit 24 charged, then at least one of those work devices 2 has to wait for their turn to come while one work device 2 is being charged by the charger 4, thus causing a decrease in the number of the work devices 2 ready to perform the work (such as the carrying work), which is problem. In the following description, when two work devices 2 need to be distinguished from each other, the two work devices 2 will be designated herein by the reference signals 2A and 2B, respectively. In the example to be described below, the number of the work devices 2 is two. However, this is only an example and should not be construed as limiting. The number of the work devices 2 does not have to be two but may also be three or more.

Figure 2:
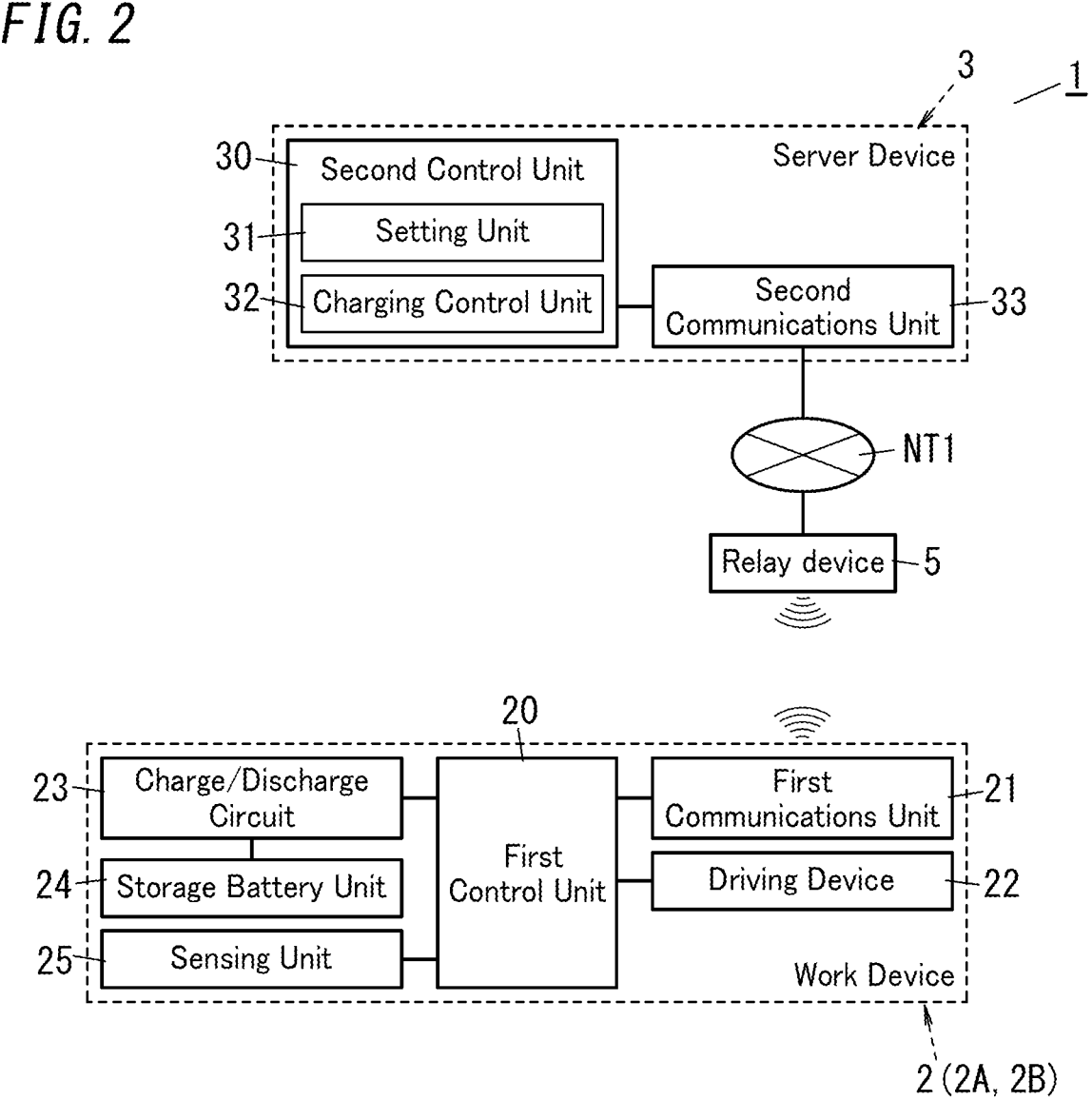
FIG. 2 is a block diagram illustrating a schematic configuration for the charging control system.

The charging control system 1 according to this embodiment includes a setting unit 31 and a charging control unit 32 as shown in FIG. 2.

Figure 3:
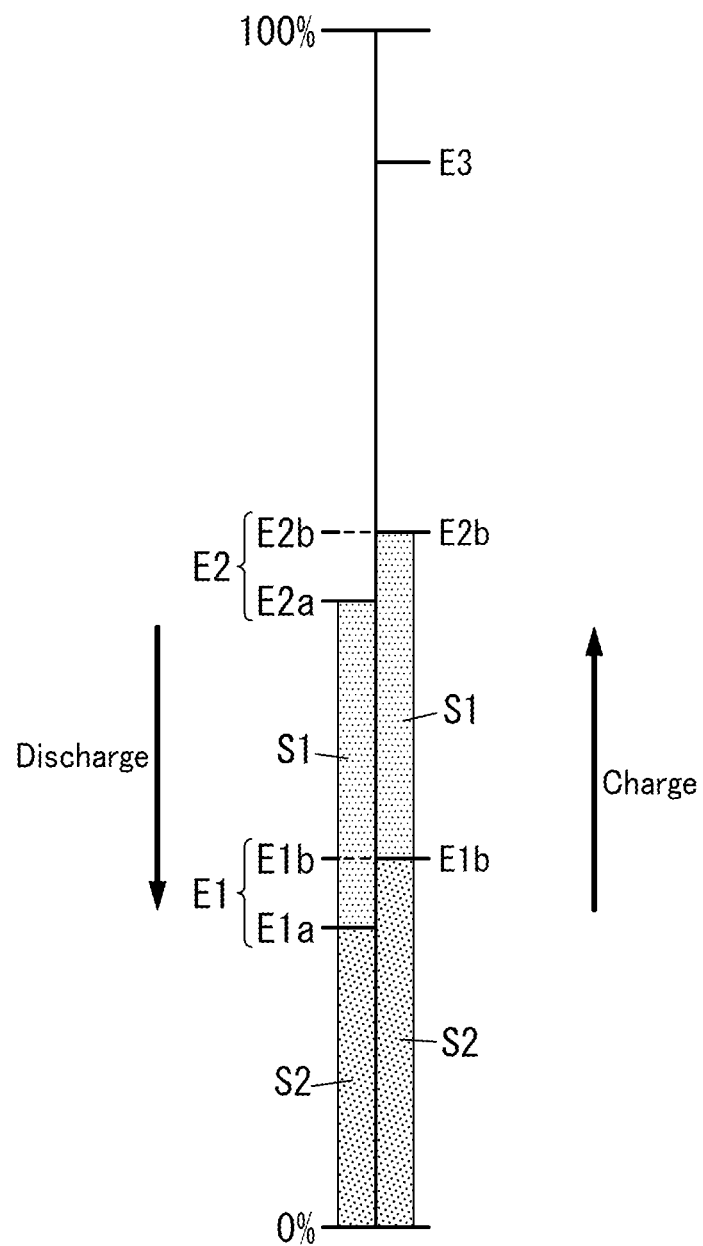
FIG. 3 is a state transition diagram illustrating how the charging control system operates.

The setting unit 31 sets at least a first threshold value E1 and a second threshold value E2 as threshold values with respect to the remaining capacity of the storage battery unit 24 included in each of a plurality of work devices 2 (see FIG. 3). The second threshold value E2 is larger than the first threshold value E1.

The charging control unit 32 designates one of the plurality of work devices 2 as a target of control 2X and controls charging of the storage battery unit 24 included in the work device 2 designated as the target of control 2X.

The charging control unit 32 outputs, in a first state (designated by S1 in FIG. 3) where the remaining capacity of the storage battery unit 24 included in the work device 2 designated as the target of control 2X is equal to or greater than the first threshold value E1 but less than the second threshold value E2, a charging start instruction to the work device 2 designated as the target of control 2X when a predetermined decision condition is satisfied.

The charging control unit 32 further outputs, in a second state (designated by S2 in FIG. 3) where the remaining capacity of the storage battery unit 24 included in the work device 2 designated as the target of control 2X is less than the first threshold value E1, the charging start instruction to the work device 2 designated as the target of control 2X, no matter whether the predetermined decision condition is satisfied or not.

As can be seen from the foregoing description, the charging control unit 32 may output, if a predetermined decision condition is satisfied when the remaining capacity of the storage battery unit 24 has decreased to establish the first state where the remaining capacity of the storage battery unit 24 is equal to or greater than the first threshold value E1 but less than the second threshold value E2, a charging start instruction to the work device 2 designated as the target of control 2X. The charging control unit 32 may output, when the predetermined condition is satisfied in the first state, the charging start instruction to the work device 2 designated as the target of control 2X. This allows the storage battery unit 24 to be charged at a point in time before the remaining capacity of the storage battery unit 24 decreases to less than the first threshold value E1. Thus, this provides a charging control system 1 that may reduce the chances of the remaining capacities of the respective storage battery units 24 of a plurality of work devices 2 decreasing at a time to less than the first threshold value E1 and thereby reduce the chances of the remaining capacities of the storage battery units 24 becoming too low to have the work (such as the carrying work) done.

(2) Details
(2.1) Configuration

The configuration of the charging control system 1 according to this embodiment will now be described in detail with reference to FIGS. 1-4. Note that the numerical values, shapes, materials, locations of respective constituent elements, arrangement of those constituent elements, and their connections to be disclosed in the following description are all only examples and should not be construed as limiting the scope of the present disclosure. In addition, the drawings to be referred to in the following description are all schematic representations. Thus, the ratio of the dimensions (including thicknesses) of respective constituent elements illustrated on the drawings does not always reflect their actual dimensional ratio.

In the following description, the work device 2 designated as the target of control 2X for the charging control system 1 is supposed to be an automated guided vehicle as an example. The automated guided vehicle as an exemplary work device 2 performs the work of carrying a burden while traveling within the working area A1.

As used herein, the "working area" refers to a space where a plurality of work devices 2 are stationed. Each of the work devices 2 travels within this working area A1 in accordance with an instruction from a server device 3, for example. Examples of the working area A1 include warehouses, factories, construction sites, stores (including shopping malls), distribution centers, offices, parks, dwelling houses, schools, hospitals, railway stations, airports, and parking lots. Furthermore, if the work devices 2 are stationed inside some public transportation such as a ship, a railway train, or an aircraft, then the working area A1 is the inside of the public transportation. In the following description of embodiments, the working area A1 is supposed to be a distribution warehouse, for example.

(2.1) Overall Configuration

The charging control system 1 includes the server device 3 and a relay device 5 placed in the working area A1 as shown in FIGS. 1 and 2.

FIG. 1 is a schematic plan view of the working area A1. In this embodiment, the working area A1 is a distribution warehouse, which is a space surrounded with outer walls 81. The working area A1 supposed to be used in this embodiment has entrances/exits 82, 83 through which a burden is carried into, or out of, the working area A1. The working area A1 is partitioned by a boundary wall 84 disposed within the working area A1. In this working area A1, only one charger 4 is placed as described above. Note that the number of the chargers 4 placed does not have to be one but may also be changed as appropriate according to the number of the work devices 2 for use in the working area A1. Although the number of the work devices 2 is two in the example illustrated in FIG. 1, the number of the work devices 2 does not have to be two but may also be three or more. Furthermore, although only one relay device 5 is shown in FIG. 1, a plurality of relay devices 5 may be arranged within the working area A1. Furthermore, the working area A1 shown in FIG. 1 is only an example and the arrangement of the working area A1 may be changed as appropriate.

The server device 3 is installed, for example, outside of the working area A1 and is connected to the plurality of relay devices 5 over a communications network NT1 such as the Internet.

The server device 3 and the plurality of work devices 2 are configured to be ready to communicate with each other. As used herein, being "ready to communicate" means being able to transmit and receive information either directly or indirectly over the communications network NT1 or via the relay device 5 by an appropriate wired or wireless communication method. That is to say, the server device 3 and each of the plurality of work devices 2 are able to transmit and receive information to/from each other. In this embodiment, each of the plurality of work devices 2 communicates with any of the plurality of relay devices 5 by wireless communication via radio waves. Thus, the server device 3 and the plurality of work devices 2 communicate with each other indirectly at least over the communications network NT1 and via the relay device 5.

That is to say, each relay device 5 is a device (or access point) to relay communications between an associated one of the work devices 2 and the server device 3. The relay device 5 communicates with the server device 3 over the communications network NT1. In this embodiment, the communication between the relay device 5 and the work device 2 may be wireless communication compliant with, for example, the Wi-Fi® standard, the Bluetooth® standard, the ZigBee® standard, or the Specific Low Power Radio standard that requires no licenses. Furthermore, the communications network NT1 does not have to be the Internet but may also be a local communications network established within either the working area A1 or an operating company that provides the working area A1.

Next, the work device 2 will be described in further detail with reference to FIGS. 1 and 2. The work device 2 travels autonomously on a flat traveling surface 80 such as the floor surface of the working area A1. The work device 2 includes a first control unit 20, a first communications unit 21, a driving device 22, a charge/discharge circuit 23, the storage battery unit 24, and a sensing unit 25. Note that each of the plurality of work devices 2 for use in the working area A1 is provided with identification information on an individual basis.

The first communications unit 21 communicates with the server device 3 (more specifically, with the second communications unit 33 of the server device 3) via the relay device 5 and the communications network NT1. In this embodiment, the first communications unit 21 communicates with the relay device 5 by a wireless communication method.

The driving device 22 makes the work device 2 travel by driving at least some of a plurality of wheels provided for the work device 2. At least some of the plurality of wheels are driving wheels. Each of the driving wheels may be an omnidirectional moving wheel such as an omni-wheel. The driving device 22 makes the work device 2 travel by turning the driving wheels in accordance with a control command given by the first control unit 20.

The storage battery unit 24 is a secondary battery such as a lithium-ion battery or a nickel-hydrogen battery.

The charge/discharge circuit 23 controls charging the storage battery unit 24 with electricity and discharging electricity from the storage battery unit 24. The charge/discharge circuit 23 stores, in the storage battery unit 24, the electrical energy supplied from the charger 4 with the work device 2 connected to the charger 4. In addition, the charge/discharge circuit 23 supplies power to the first control unit 20, the first communications unit 21, and the driving device 22 by discharging electrical energy from the storage battery unit 24. That is to say, the work device 2 performs the specified work by using the electrical energy stored in the storage battery unit 24.

The sensing unit 25 detects, for example, current location information about the location where the work device 2 is currently located within the working area A1. The sensing unit 25 includes, for example, a receiver for receiving beacon signals transmitted as radio waves from a plurality of transmitters. The plurality of transmitters are arranged at a plurality of sites within the working area A1. The sensing unit 25 determines the current location of the work device 2 based on the locations of the plurality of transmitters and the radio field strengths of the beacon signals received at the receiver. The sensing unit 25 may be implemented as a satellite positioning system such as a global positioning system (GPS). The work device 2 transmits, at predetermined transmission time intervals (e.g., at intervals of 1 second), the information about the current location detected by the sensing unit 25 and the identification information of the work device 2 from the first communications unit 21 to the server device 3. Optionally, the work device 2 may transmit, in response to a transmission request from the server device 3, for example, the information about the current location detected by the sensing unit 25 and the identification information of the work device 2 from the first communications unit 21 to the server device 3 at irregular intervals.

Optionally, the sensing unit 25 may detect, for example, the operating state of the work device 2 and the situation surrounding the work device 2. As used herein, the "operating state" of the work device 2 refers to the remaining capacity of the storage battery unit 24 included in the work device 2, the operating status, which is either traveling or at a stop, of the work device 2, the velocity (and variation in the velocity) of the work device 2, acceleration applied to the work device 2, and the orientation of the work device 2. Specifically, the sensing unit 25 includes some type of sensor such as a velocity sensor, an acceleration sensor, or a gyrosensor to detect the operating state of the work device 2 using any of these sensors. The sensing unit 25 also includes another type of sensor such as an image sensor (camera), a sonar sensor, a radar, or a light detection and ranging sensor (LiDAR) to detect the situation surrounding the work device 2 by using any of these sensors. The situation surrounding the work device 2 includes the presence or absence of any object (obstacle) in/from the traveling direction, and in front, of the work device 2, and the location (including the distance and azimuth) of the object, if any. Examples of the obstacles include other work devices 2 and humans. Note that the work device 2 transmits, at predetermined transmission time intervals (of approximately 1 second to a few minutes, for example), the information about the remaining capacity of the storage battery unit 24 detected by the sensing unit 25 and the identification information of the work device 2 from the first communications unit 21 to the server device 3.

The first control unit 20 includes, at its major constituent element, a computer system including a memory and a processor, for example. That is to say, the computer system performs the functions of the first control unit 20 by making the processor execute a program stored in the memory of the computer system. The program may be stored in advance in the memory. Alternatively, the program may also be downloaded via a telecommunications line such as the Internet or distributed after having been stored in a non-transitory storage medium such as a memory card. The first control unit 20 makes, on receiving a command to carry the burden from the server device 3, for example, the work device 2 travel autonomously by controlling the driving device 22 based on the current location information, the operating states of the surrounding work devices 2, and the surrounding situation as detected by the sensing unit 25. The first control unit 20 has the burden, specified by the server device 3, carried to its destination by controlling traveling of the work device 2.

Next, the server device 3 will be described in further detail with reference to FIGS. 1 and 2. The server device 3 includes a second control unit 30 and the second communications unit 33.

The second communications unit 33 communicates with the relay device 5 via the communications network NT1. The second communications unit 33 communicates with each of a plurality of (e.g., two in this embodiment) work devices 2 via the communications network NT1 and the relay device 5. As the method of communication between the second communications unit 33 and the relay device 5, any appropriate communication method such as a wireless communication or a wired communication may be adopted as appropriate.

The second control unit 30 includes, at its major constituent element, a computer system including a memory and a processor, for example. That is to say, the computer system performs the functions of the second control unit 30 (e.g., the respective functions of the setting unit 31 and the charging control unit 32) by making the processor execute a program stored in the memory of the computer system. The program may be stored in advance in the memory. Alternatively, the program may also be downloaded via a telecommunications line such as the Internet or distributed after having been stored in a non-transitory storage medium such as a memory card.

The setting unit 31 sets, as threshold values with respect to the remaining capacity of the storage battery unit 24 included in each of the plurality of work devices 2, at least a first threshold value E1 and a second threshold value E2, which is larger than the first threshold value E1, as shown in FIG. 3. The first threshold value E1 and the second threshold value E2 are threshold values used to determine whether or not the storage battery unit 24 needs to be charged. Specifically, the first threshold value E1 is a threshold value for use to determine whether or not to make the work device 2 charge its storage battery unit 24 by giving a higher priority to charging rather than to the work. Supposing the fully charged state of the storage battery unit 24 is 100%, the first threshold value may be set, for example, at a battery level of 10%. The second threshold value E2 is set a value larger than the first threshold value E1 and may be set, for example, at a battery level of 20%. Suppose a situation where the respective storage battery units 24 of two work devices 2 have come to have a remaining capacity less than the second threshold value E2 at the same time. In that case, the storage battery unit 24 of only one of the two work devices 2 may be charged because only one charger 4 is installed in the working area A1. Thus, while the charger 4 is charging the storage battery unit 24 of the one work device 2, the remaining capacity of the storage battery unit 24 of the other work device 2 continues to decrease. Thus, to prevent the remaining capacity of the storage battery unit 24 of the other work device 2 from being exhausted before the charger 4 finishes charging the storage battery unit 24 of the one work device 2, the second threshold value E2 is set at a value larger than the first threshold value E1 with the charging time of the work device 2 taken into account.

In this embodiment, the setting unit 31 may provide a hysteresis between the threshold value (including the first threshold value E1 and the second threshold value E2) in a discharged state where the storage battery unit 24 has discharged and the threshold value (including the first threshold value E1 and the second threshold value E2) in a charging state where the storage battery unit 24 is being charged. For example, the setting unit 31 may provide hysteresis for the first threshold value by setting the first threshold value when the storage battery unit 24 has discharged at E1$a$ and setting the first threshold value when the storage battery unit 24 is being charged at E1$b$ (where E1$b$>E1$a$). In other words, the setting unit 31 may provide a difference (hysteresis) between the first threshold value E1$a$ and the first threshold value E1$b$ such that the first threshold value E1$b$ in the charging state where the remaining capacity of the storage battery unit 24 increases has a larger value than the first threshold value E1$a$ in the discharging state where the remaining capacity of the storage battery unit 24 decreases. This may reduce, when the remaining capacity of the storage battery unit 24 is varying around the first threshold value, the chances of the state of the work device 2 hunting between the first state and the second state. Alternatively, the setting unit 31 may provide hysteresis for the second threshold value by setting the second threshold value when the storage battery unit 24 has discharged at E2$a$ and setting the second threshold value when the storage battery unit 24 is being charged at E2$b$ (where E2$b$>E2$a$). In other words, the setting unit 31 may provide a difference (hysteresis) between the second threshold value E2$a$ and the second threshold value E2$b$ such that the second threshold value E2$b$ in the charging state where the remaining capacity of the storage battery unit 24 increases has a larger value than the second threshold value E2$a$ in the discharging state where the remaining capacity of the storage battery unit 24 decreases. This may reduce, when the remaining capacity of the storage battery unit 24 is varying around the second threshold value, the chances of the state of the work device 2 hunting between the second state and a state that is neither the first state nor the second state.

In addition, the setting unit 31 further sets a third threshold value E3 as still another threshold value. The third threshold value is a threshold value for use to determine whether or not to finish charging the work device 2 being charged. The third threshold value E3 may be set, for example, at a battery level of 90%.

The charging control unit 32 designates one of a plurality of (e.g., two in this embodiment) work devices (2A, 2B) as a target of control 2X (hereinafter referred to as a "work device 2 designated as a target of control 2X").

The charging control unit 32 outputs, in a first state where the remaining capacity of the storage battery unit 24 included in the work device 2 designated as the target of control 2X is equal to or greater than the first threshold value E1 but less than the second threshold value E2, a charging start instruction to the work device 2 designated as the target of control 2X when a predetermined decision condition is satisfied. The charging start instruction is output to instruct the work device 2 designated as the target of control 2X to start charging. That is to say, as long as the predetermined decision condition is satisfied in the first state, the charging control unit 32 outputs the charging start instruction to the work device 2 designated as the target of control 2X. This allows the charging start instruction to be output before the remaining capacity of the storage battery unit 24 decreases to less than the first threshold value E1. Thus, the charging control unit 32 may output the charging start instruction to the work device 2 designated as the target of control 2X to reduce the chances of the storage battery unit 24 coming to have too low a remaining capacity to allow the work device 2 to operate properly.

In this case, the predetermined decision condition may include, for example, a condition based on the number of tasks of the work assigned to the work device 2. As used herein, the "condition based on the number of tasks of the work" may be a condition that the number of tasks of the work yet to be done be smaller than the number of work devices 2 that are ready to perform the work. Also, as used herein, the "work devices 2 that are ready to perform the work" refer to work devices 2 that are neither performing any work (such as carrying work) nor being charged. In the first state, if the number of tasks yet to be done is equal to or greater than the number of work devices 2 that are ready to perform the work, then the charging control unit 32 does not allow the work device 2 designated as the target of control 2X to be charged, thus reducing the chances of the number of the work devices 2 that are ready to perform the work decreasing too much to perform the work yet to be done. On the other hand, in the first state, if the number of tasks yet to be done is less than the number of work devices 2 that are ready to perform the work, then the charging control unit 32 allows the work device 2 designated as the target of control 2X to be charged, thus enabling charging the work device 2 designated as the target of control 2X while reducing the chances of leaving the work yet to be done unfinished.

Also, when finding the remaining capacity of the storage battery unit 24 included in the work device 2 designated as the target of control 2X equal to or greater than the third threshold value E3 while the work device 2 designated as the target of control 2X is being charged, the charging control unit 32 outputs a charging end instruction to the work device 2 designated as the target of control 2X. The charging end instruction is output to instruct the work device 2 designated as the target of control 2X to finish charging. Thus, the charging control unit 32 allows the work device 2 designated as the target of control 2X to be charged until the remaining capacity of the storage battery unit 24 thereof becomes equal to or greater than the third threshold value E3.

(2.1.2) Description of Operation

Figure 4:
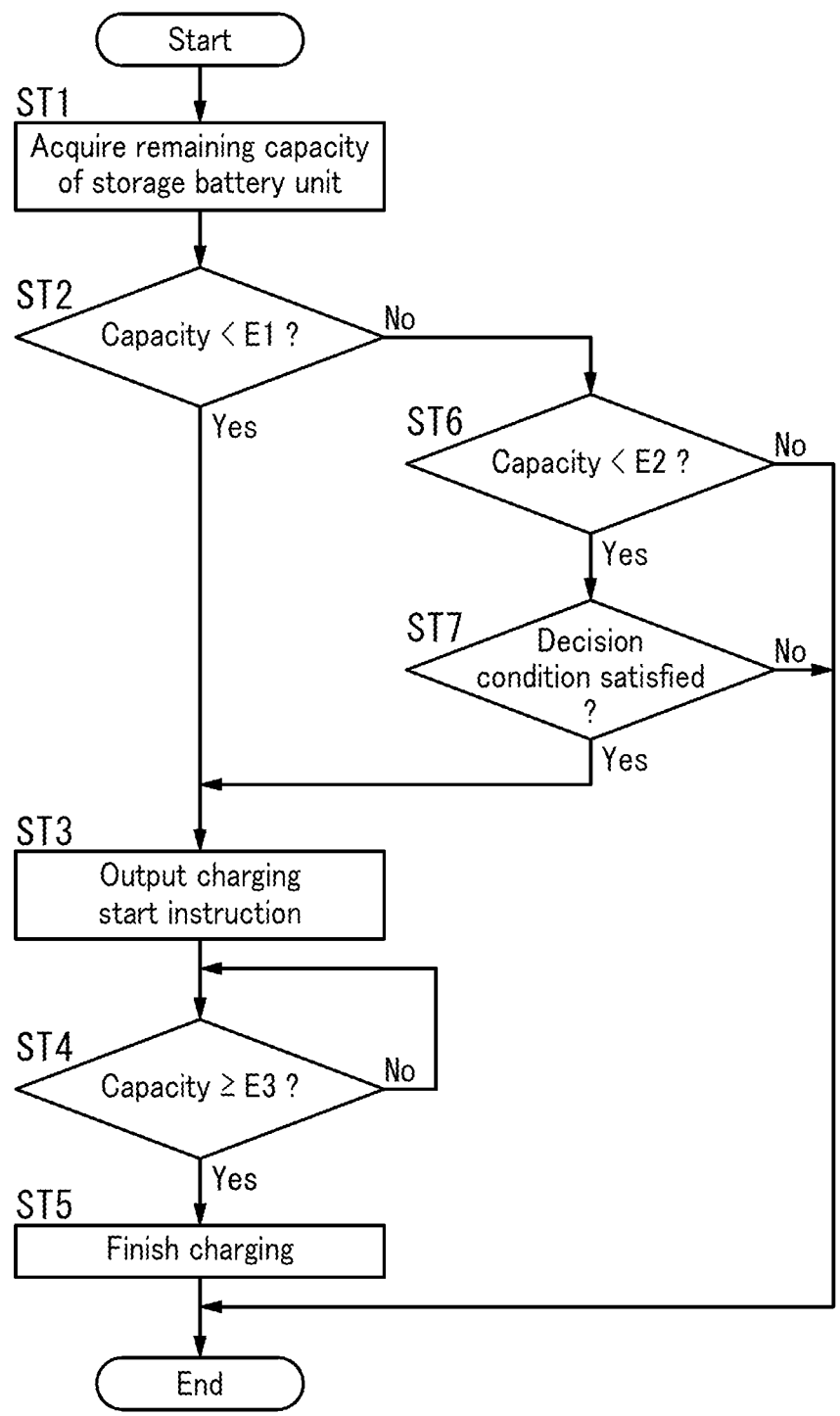
FIG. 4 is a flowchart illustrating how the charging control system operates.

Next, it will be described with reference to FIG. 4 how the charging control system 1 according to this embodiment operates.

Each of the plurality of work devices 2 for use in the working area A1 makes the first communications unit 21 transmit, at predetermined transmission intervals, information about the remaining capacity of the storage battery unit 24 thereof and the identification information of the work device 2 itself to the server device 3 via the relay device 5 and the communications network NT1.

The charging control unit 32 of the server device 3 sequentially designates one of the plurality of work devices 2A, 2B as the target of control 2X after another. Then, on acquiring information about the remaining capacity of the storage battery unit 24 from the plurality of work devices 2A, 2B (in ST1), the charging control unit 32 compares the remaining capacity of the storage battery unit 24 of the work device 2, designated as the target of control 2X out of the plurality of work devices 2A, 2B, with the first threshold value E1 (in ST2).

In this case, when finding the remaining capacity of the storage battery unit 24 of the work device 2 designated as the target of control 2X less than the first threshold value E1 (i.e., when finding this is the second state) (if the answer is YES in ST2), the charging control unit 32 makes the second communications unit 33 transmit a charging start instruction to the work device 2 designated as the target of control 2X (in ST3).

If the work device 2 designated as the target of control 2X is performing no work when the first communications unit 21 of the work device 2 designated as the target of control 2X receives the charging start instruction that has been transmitted from the server device 3, then the first control unit 20 controls the driving device 22 to make the work device 2 designated as the target of control 2X move to the charging standby area A3. On the other hand, if the work device 2 designated as the target of control 2X designated as the target of control 2X is performing work when the first communications unit 21 of the work device 2 designated as the target of control 2X receives the charging start instruction from the server device 3, then the first control unit 20 controls, after the work has been done, the driving device 22 to make the work device 2 move to the charging standby area A3. If there is any other work device 2 in the charging area A2 when the work device 2 designated as the target of control 2X has moved to reach the charging standby area A3, then the work device 2 designated as the target of control 2X will wait in the charging standby area A3. On the other hand, if no other work device 2 is being charged in the charging area A2 when the work device 2 designated as the target of control 2X has moved to reach the charging standby area A3, then the first control unit 20 of the work device 2 designated as the target of control 2X makes the work device 2 designated as the target of control 2X move to the charging area A2 to have the charge/discharge circuit 23 electrically connected to the charger 4. At this time, the charge/discharge circuit 23 of the work device 2 designated as the target of control 2X charges the storage battery unit 24 with the electrical energy supplied from the charger 4. When finding the remaining capacity of the storage battery unit 24 as detected by the sensing unit 25 less than the third threshold value E3 (if the answer is NO in ST4), the first control unit 20 of the work device 2 designated as the target of control 2X continues charging. On the other hand, when finding the remaining capacity of the storage battery unit 24 as detected by the sensing unit 25 equal to or greater than the third threshold value E3 (if the answer is YES in ST4), the first control unit 20 of the work device 2 designated as the target of control 2X finishes charging (in ST5).

Meanwhile, if the decision made in step ST2 is that the remaining capacity of the storage battery unit 24 of the work device 2 designated as the target of control 2X is equal to or greater than the first threshold value E1 (if the answer is NO in ST2), then the charging control unit 32 compares the remaining capacity of the storage battery unit 24 of the work device 2 designated as the target of control 2X with the second threshold value E2 (in ST6).

In this processing step, if the remaining capacity of the storage battery unit 24 of the work device 2 designated as the target of control 2X is equal to or greater than the second threshold value E2 (if the answer is NO in ST6), then the charging control unit 32 decides that there be no need to charge the work device 2 designated as the target of control 2X to end the processing.

On the other hand, if the remaining capacity of the storage battery unit 24 of the work device 2 designated as the target of control 2X is less than the second threshold value E2 (i.e., if this is the second state) (if the answer is YES in ST6), then the charging control unit 32 determines whether or not the predetermined decision condition is satisfied (in Step ST7). In this embodiment, the predetermined decision condition is a condition based on the number of tasks of the work assigned to the work devices 2. The predetermined decision condition may be, for example, a condition that the number of tasks yet to be done be fewer than the number of work devices 2 that are ready to perform the work (such as carrying work).

If the decision made in ST7 is that the predetermined decision condition is not satisfied (if the answer is NO in ST7), then the charging control unit 32 decides that the work device 2 designated as the target of control 2X not be charged at this time to end the processing. That is to say, if the number of tasks yet to be done is equal to or greater than the number of the work devices 2 that are ready to perform the work, then the charging start instruction is not output to the work device 2 designated as the target of control 2X to allow the work device 2 designated as the target of control 2X to continue performing the work until the remaining capacity of the storage battery unit 24 decreases to less than the first threshold value E1. Thus, the charging control system 1 according to this embodiment may reduce the chances of leaving the work yet to be done unfinished.

On the other hand, if the decision made in ST7 is that the predetermined decision condition is satisfied (if the answer is YES in ST7), then the charging control unit 32 outputs the charging start instruction to the work device 2 designated as the target of control 2X (in ST3) to make the work device 2 designated as the target of control 2X have its storage battery unit 24 charged. If the predetermined decision condition is satisfied, then the charging control unit 32 outputs the charging start instruction to the work device 2 designated as the target of control 2X. The charging control unit 32 instructs that charging be started at the timing when the remaining capacity of the storage battery unit 24 has decreased to less than the second threshold value E2 that is larger than the first threshold value E1, thus enabling charging the work device 2 designated as the target of control 2X earlier than the other work devices 2.

(3) Variations

Note that the embodiment described above is only an exemplary one of various embodiments of the present disclosure and should not be construed as limiting. Rather, the exemplary embodiment may be readily modified in various manners depending on a design choice or any other factor without departing from the scope of the present disclosure. Furthermore, the functions performed by the charging control system 1 may also be implemented as a charging control method, a computer program, or a non-transitory storage medium on which the program is stored. A charging control method according to an aspect includes setting processing and charging control processing. The setting processing includes setting at least a first threshold value E1 and a second threshold value E2 as threshold values with respect to a remaining capacity of a storage battery unit 24 included in each of a plurality of work devices 2. The second threshold value E2 is larger than the first threshold value E1. The charging control processing includes designating one of the plurality of work devices 2 as a target of control 2X and controlling, based on the remaining capacity of the storage battery unit 24 included in the work device designated as the target of control 2X, charging of the storage battery unit 24. The charging control processing includes outputting, in a first state where the remaining capacity of the storage battery unit 24 included in the work device 2 designated as the target of control 2X is equal to or greater than the first threshold value E1 but less than the second threshold value E2, a charging start instruction to the work device 2 designated as the target of control 2X when a predetermined decision condition is satisfied. The charging control processing further includes outputting, in a second state where the remaining capacity of the storage battery unit 24 included in the work device 2 designated as the target of control 2X is less than the first threshold value E1, the charging start instruction to the work device 2 designated as the target of control 2X, no matter whether the predetermined decision condition is satisfied or not. A (computer) program according to another aspect is designed to cause a computer system to perform the setting processing and the charging control processing.

Next, variations of the exemplary embodiment will be enumerated one after another. Optionally, the variations to be described below may be adopted in combination as appropriate.

The charging control system 1 according to the present disclosure (the work devices 2 and server device 3) includes a computer system. The computer system may include a processor and a memory as principal hardware components. The functions of the charging control system 1 according to the present disclosure may be performed by making the processor execute a program stored in the memory of the computer system. The program may be stored in advance in the memory of the computer system. Alternatively, the program may also be downloaded through a telecommunications line or be distributed after having been recorded in some non-transitory storage medium such as a memory card, an optical disc, or a hard disk drive, any of which is readable for the computer system. The processor of the computer system may be implemented as a single or a plurality of electronic circuits including a semiconductor integrated circuit (IC) or a large-scale integrated circuit (LSI). As used herein, the "integrated circuit" such as an IC or an LSI is called by a different name depending on the degree of integration thereof. Examples of the integrated circuits include a system LSI, a very large-scale integrated circuit (VLSI), and an ultra large-scale integrated circuit (ULSI). Optionally, a field-programmable gate array (FPGA) to be programmed after an LSI has been fabricated or a reconfigurable logic device allowing the connections or circuit sections inside of an LSI to be reconfigured may also be adopted as the processor. Those electronic circuits may be either integrated together on a single chip or distributed on multiple chips, whichever is appropriate. Those multiple chips may be integrated together in a single device or distributed in multiple devices without limitation. As used herein, the "computer system" includes a microcontroller including one or more processors and one or more memories. Thus, the microcontroller may also be implemented as a single or a plurality of electronic circuits including a semiconductor integrated circuit or a largescale integrated circuit.

Also, the plurality of constituent elements (or the functions) of the charging control system 1 do not have to be integrated together in a single housing, because this is not a configuration essential for the charging control system 1. Alternatively, those constituent elements (or functions) of the charging control system 1 may be distributed in multiple different housings. Still alternatively, at least some functions of the charging control system 1 (e.g., the function of the charging control unit 32) may be implemented as a cloud computing system as well.

Furthermore, in the foregoing description of embodiments, if one of two values (e.g., the remaining capacity of the storage battery unit 24 and the threshold value) being compared with each other is "less than" the other, the phrase "less than" may also be a synonym of the phrase "equal to or less than" that covers both a situation where these two values are equal to each other and a situation where one of the two values is less than the other. That is to say, it is arbitrarily changeable, depending on selection of a reference value or any preset value, whether or not the phrase "less than" covers the situation where the two values are equal to each other. Therefore, from a technical point of view, there is no difference between the phrase "less than" and the phrase "equal to or less than." Similarly, the phrase "equal to or greater than" may be a synonym of the phrase "greater than" as well in the embodiment described above.

In the embodiment described above, the work device 2 is a carrier traveling in the working area A1. Alternatively, the work device 2 may also be a watercraft (autonomous ship) or an aircraft (drone). If the work device 2 is an autonomous ship, then the working area A1 is the body of water where the autonomous ship is cruising. On the other hand, if the work device 2 is a drone, then the working area A1 is the space where the drone is flying.

(3.1) First Variation

Next, a charging control system 1 according to a first variation will be described with reference to FIG. 5. Note that the charging control system 1 according to the first variation has the same configuration as the charging control system 1 of the embodiment described above. Thus, any constituent element of the first variation, having the same function as a counterpart of the embodiment described above, will be designated by the same reference numeral as that counterpart's, and description thereof will be omitted herein.

In the charging control system 1 according to the first variation, the decision condition described above includes, for example, a condition based on the remaining capacity of the storage battery unit 24 included in one or more work devices 2, other than the work device 2 designated as the target of control 2X, out of the plurality of work devices 2. This allows the charging control unit 32 to determine, in the first state, based on the remaining capacity of the storage battery unit 24 included in one or more work devices 2 other than the work device 2 designated as the target of control 2X, whether or not the charging start instruction should be output to the work device 2 designated as the target of control 2X. The predetermined decision condition may be, for example, that the number of the work devices 2, of which the storage battery unit 24 has come to have a remaining capacity less than the second threshold value E2, be larger than the number of the work devices 2 that can be charged by the charger 4 (hereinafter referred to as "the number of chargeable devices"). If the predetermined decision condition is satisfied, then the charging control unit 32 outputs the charging start instruction to that number of chargeable work devices 2, out of the plurality of work devices 2, of which the storage battery unit 24 has come to have a remaining capacity less than the second threshold value E2.

In this embodiment, the number of the work devices 2 that can be charged by the charger 4 is one. Thus, the charging control unit 32 decides, when finding, in the first state, the number of the work devices 2, of which the storage battery unit 24 has come to have a remaining capacity less than the second threshold value E2, two or more (e.g., two in this embodiment), that the decision condition be satisfied. If the decision condition is satisfied, the charging control unit 32 outputs the charging start instruction to the work device 2 designated as the target of control 2X, out of the two work devices 2, of which the storage battery unit 24 has come to have a remaining capacity less than the second threshold value E2. Thus, if the number of the work devices 2, of which the storage battery unit 24 has come to have a remaining capacity less than the second threshold value E2, is two or more in the first state where the remaining capacity of the storage battery unit 24 of the work device 2 designated as the target of control 2X is less than the second threshold value E2, then the charging control unit 32 outputs the charging start instruction to the work device 2 designated as the target of control 2X. This allows the work device 2 designated as the target of control 2X to have its storage battery unit 24 charged earlier than the other work devices 2, thus enabling reducing the chances of the remaining capacity of the storage battery unit 24 decreasing too much to allow the work device 2 operate properly.

On the other hand, when finding the remaining capacity of the storage battery unit 24 included in the work device 2 designated as the target of control 2X less than the first threshold value E1, the server device 3 outputs the charging start instruction to the work device 2 designated as the target of control 2X. On receiving the charging start instruction while performing no work in the second state, the work device 2 designated as the target of control 2X moves to the charging area A2 to perform the work of charging the storage battery unit 24. On the other hand, on receiving the charging start instruction while performing work in the second state, the work device 2 designated as the target of control 2X will move to the charging area A2 and perform the work of charging the storage battery unit 24 when the work device 2 designated as the target of control 2X finishes the work that the work device 2 designated as the target of control 2X is now performing. Note that even if the work device 2 designated as the target of control 2X has another work to do after having finished the work that the work device 2 designated as the target of control 2X is now performing, the work device 2 designated as the target of control 2X gives a higher priority to charging rather than to the work and moves to the charging area A2 to perform the work of charging the storage battery unit 24.

On the other hand, in the second state where the remaining capacity of the storage battery unit 24 included in the work device 2 designated as the target of control 2X is less than the first threshold value E1, the charging control unit 32 makes the second communications unit 33 output the charging start instruction to the work device 2 designated as the target of control 2X, no matter whether the decision condition is satisfied or not. That is to say, when finding the remaining capacity of the storage battery unit 24 included in the work device 2 designated as the target of control 2X less than the first threshold value E1, the server device 3 outputs the charging start instruction to the work device 2 designated as the target of control 2X. On receiving the charging start instruction while performing no work in the second state, the work device 2 designated as the target of control 2X moves to the charging area A2 to perform the work of charging the storage battery unit 24. On the other hand, on receiving the charging start instruction while performing work in the second state, the work device 2 designated as the target of control 2X will move to the charging area A2 and perform the work of charging the storage battery unit 24 when the work device 2 designated as the target of control 2X finishes the work that the work device 2 designated as the target of control 2X is now performing. Note that even if the work device 2 designated as the target of control 2X has another work to do after having finished the work that the work device 2 designated as the target of control 2X is now performing, the work device 2 gives a higher priority to charging rather than to the work and moves to the charging area A2 to perform the work of charging the storage battery unit 24.

Such an operation of the charging control system 1 will be described with reference to FIG. 5. FIG. 5 schematically shows a variation with time in the remaining capacity of the storage battery unit 24 included in each of the two work devices 2A, 2B. In FIG. 5, the line L1 indicates the variation with time in the remaining capacity of the storage battery unit 24 included in the work device 2A, while the line L2 indicates the variation with time in the remaining capacity of the storage battery unit 24 included in the work device 2B. In FIG. 5, the remaining capacity of the storage battery unit 24 increases or decreases at a constant rate of variation. In some cases, however, the rate of variation in the remaining capacity of the storage battery unit 24 may be inconstant depending on the volume of the work to be done by the work device 2.

Figure 5:
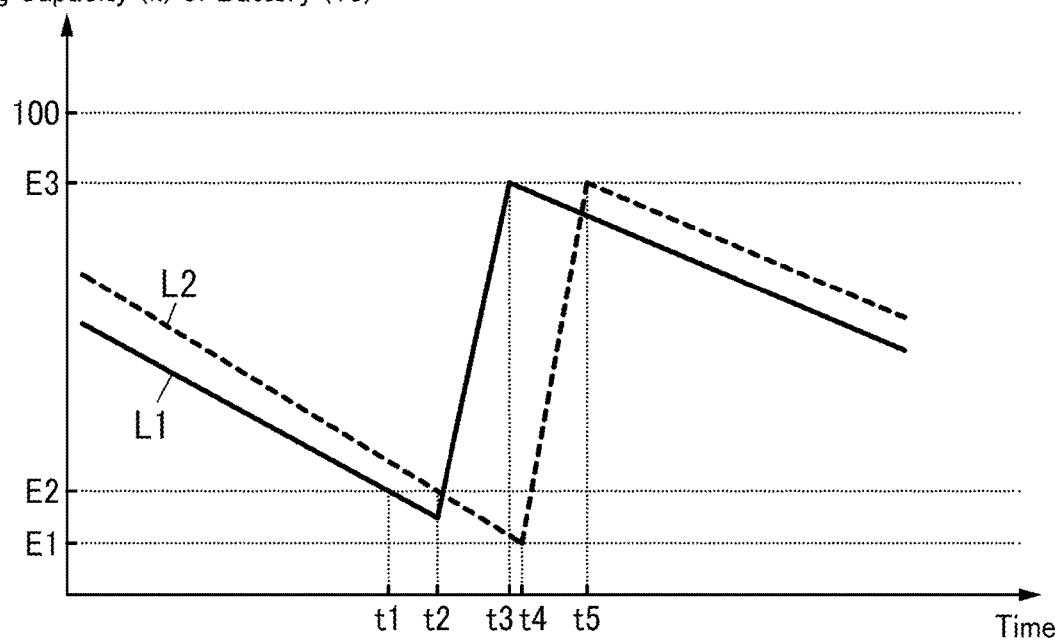
FIG. 5 is a graph showing how the remaining capacities of respective storage battery units included in work devices designated as targets of control for a charging control system according to a first variation change with time.

In the example illustrated in FIG. 5, before a time t1, the remaining capacity of the storage battery unit 24 is equal to or greater than the second threshold value E2 in each of the work devices 2A, 2B, and therefore, the charging control unit 32 does not output the charging start instruction to any of the work devices 2A, 2B.

If the remaining capacity of the storage battery unit 24 decreases with time in each of the work devices 2A, 2B to make the remaining capacity of the storage battery unit 24 of the work device 2A less than the second threshold value E2 but equal to or greater than the first threshold value E1 at the time t1, then the charging control unit 32 determines whether or not the decision condition is satisfied. In the period from the time t1 to before a time t2, the remaining capacity of the storage battery unit 24 of the work device 2B is equal to or greater than the second threshold value E2. Thus, the charging control unit 32 decides that the decision condition not be satisfied, and therefore, does not output the charging start instruction to the work device 2A. At the time t2, the remaining capacity of the storage battery unit 24 of the work device 2B also becomes less than the second threshold value E2. Thus, the charging control unit 32 decides that the decision condition be satisfied and outputs the charging start instruction to the work device 2A with the smaller remaining capacity. In response, the work device 2A moves to the charging area A2 and starts charging. As a result, the remaining capacity of the storage battery unit 24 of the work device 2A increases. On the other hand, the work device 2B is not performing the charging work, and therefore, the remaining capacity of the storage battery unit 24 of the work device 2B continues to decrease. Thereafter, when the remaining capacity of the storage battery unit 24 of the work device 2A becomes equal to or greater than the third threshold value E3 at a time t3, the work device 2A finishes charging the storage battery unit 24 and becomes once again ready to perform the work (such as carrying work). Meanwhile, if the remaining capacity of the storage battery unit 24 of the work device 2B continues to decrease to less than the first threshold value E1 at a time t4 (i.e., when the work device 2B enters the second state), the charging control unit 32 outputs the charging start instruction to the work device 2B. In response, the work device 2B moves to the charging area A2 and starts charging. Thereafter, when the remaining capacity of the storage battery unit 24 of the work device 2B becomes equal to or greater than the third threshold value E3 at a time t5, the work device 2B finishes charging the storage battery unit 24 and becomes once again ready to perform the work (such as carrying work).

Figure 6:
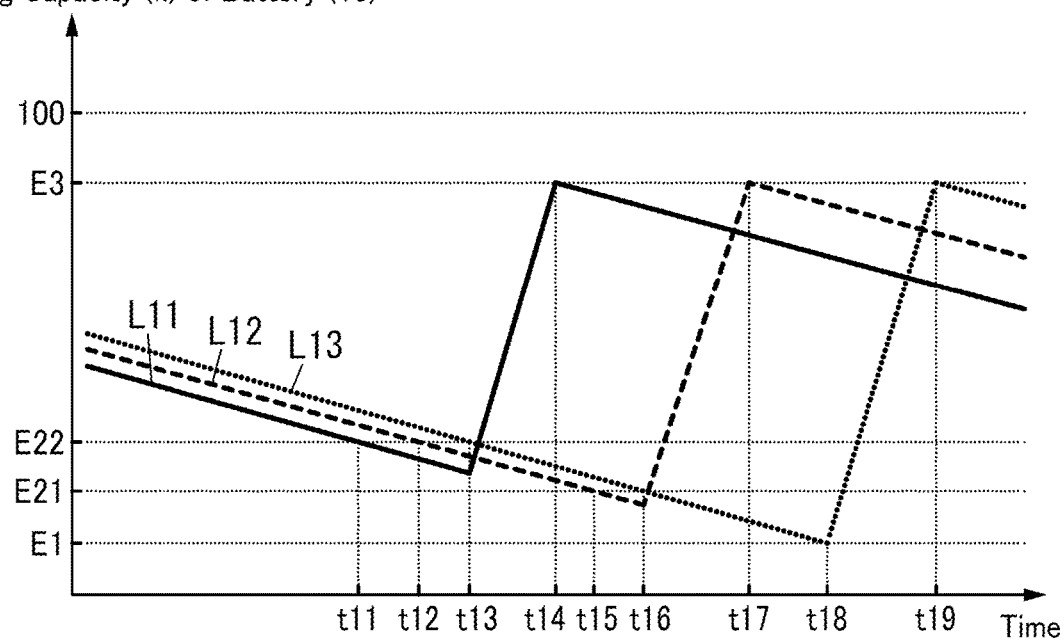
FIG. 6 is a graph showing how the remaining capacities of respective storage battery units included in three work devices provided for the charging control system according to the first variation change with time.

According to this first variation, the setting unit 31 may set a plurality of second threshold values E2 as the threshold values as shown in FIG. 6.

For example, in a situation where the number of the work devices 2 for use in the working area A1 is three and the number of the work devices 2 that can be charged by the charger 4 at a time (hereinafter referred to as "the number of chargeable devices") is one, the number of the work devices 2 in the first state (e.g., three at maximum) is sometimes more than twice as large as the number of chargeable devices (e.g., one). In that case, the setting unit 31 sets a plurality of second (e.g., two) threshold values E21, E22 (where E21<E22) as the second threshold value as shown in FIG. 6. In the following description, if the three work devices 2 need to be distinguished from each other, then the three work devices 2 will be designated by the reference signs 2A, 2B, and 2C, respectively. FIG. 6 shows a variation with time in the remaining capacity of the storage battery unit 24 included in each of the three work devices 2A, 2B, 2C. In FIG. 6, the line L11 indicates the variation with time in the remaining capacity of the storage battery unit 24 included in the work device 2A, the line L12 indicates the variation with time in the remaining capacity of the storage battery unit 24 included in the work device 2B, and the line L13 indicates the variation with time in the remaining capacity of the storage battery unit 24 included in the work device 2C.

In the example illustrated in FIG. 6, before the time t11, the remaining capacity of the storage battery unit 24 is equal to or greater than the larger second threshold value E22 in each of the work devices 2A, 2B, 2C. Thus, the charging control unit 32 does not output the charging start instruction to any of the work devices 2A, 2B, 2C.

If the remaining capacity of the storage battery unit 24 decreases with time in each of the work devices 2A, 2B, 2C to make the remaining capacity of the storage battery unit 24 of the work device 2A less than the second threshold value E22 but equal to or greater than the first threshold value E1 at the time t11, then the charging control unit 32 determines whether or not the decision condition is satisfied. In the first variation, the decision condition used by the charging control unit 32 may include two conditions, which will be hereinafter referred to as a first condition and a second condition, respectively. Specifically, the first condition is that the number of the work devices 2, of which the storage battery unit 24 has come to have a remaining capacity less than the second threshold value E22, be more than twice as large as the number of the work devices 2 that can be charged by the charger 4 (hereinafter referred to as "the number of chargeable devices"). The second condition is that the number of the work devices 2, of which the storage battery unit 24 has come to have a remaining capacity less than the second threshold value E22, be larger than the number of the work devices 2 that can be charged by the charger 4.

At a time t12, the work device 2B also enters the first state. In the period from the time t11 to before a time t13, the remaining capacity of the storage battery unit 24 of the work device 2C is equal to or greater than the second threshold value E22, and therefore, the number of the work devices 2, of which the storage battery unit 24 has come to have a remaining capacity less than the second threshold value E22, is two. Thus, the charging control unit 32 decides that neither the first condition nor the second condition be satisfied and does not output the charging start instruction to any of the work devices 2A-2C.

After the time t13 is passed, the remaining capacity of the storage battery unit 24 of the work device 2C also becomes less than the second threshold value E22, and therefore, the number of the work devices 2, of which the storage battery unit 24 has come to have a remaining capacity less than the second threshold value E22, becomes three, which is more than twice as large as the number of chargeable devices. At this time, the charging control unit 32 decides that the first condition be satisfied and outputs the charging start instruction to the work device 2A with the smaller remaining capacity. In response, the work device 2A moves to the charging area A2 and starts charging. As a result, the remaining capacity of the storage battery unit 24 of the work device 2A increases. On the other hand, the work devices 2B, 2C are not performing charging work, and therefore, the remaining capacity of the storage battery unit 24 of the work devices 2B, 2C continues to decrease. Thereafter, when the remaining capacity of the storage battery unit 24 of the work device 2A becomes equal to or greater than the third threshold value E3 at a time t14, the work device 2A finishes charging the storage battery unit 24 and becomes once again ready to perform the work (such as carrying work).

After that, the remaining capacity of the storage battery unit 24 continues to decrease in the work devices 2B, 2C. As a result, at a time t15, the remaining capacity of the storage battery unit 24 of the work device 2B becomes less than the second threshold value E21. Meanwhile, the remaining capacity of the storage battery unit 24 of the work device 2C is equal to or greater than the second threshold value E21. Thus, the charging control unit 32 decides that the second condition not be satisfied. Thereafter, at a time t16, the remaining capacity of the storage battery unit 24 of the work device 2C also becomes less than the second threshold value E21. Then, the charging control unit 32 decides that the second condition be satisfied and outputs the charging start instruction to the work device 2B with the smaller remaining capacity. In response, the work device 2B moves to the charging area A2 and starts charging. As a result, the remaining capacity of the storage battery unit 24 of the work device 2B increases. On the other hand, the work device 2C is not performing the charging work, and therefore, the remaining capacity of the storage battery unit 24 of the work device 2C continues to decrease. Thereafter, when the remaining capacity of the storage battery unit 24 of the work device 2B becomes equal to or greater than the third threshold value E3 at a time t17, the work device 2B finishes charging the storage battery unit 24 thereof and becomes once again ready to perform the work (such as carrying work).

After that, the remaining capacity of the storage battery unit 24 continues to decrease in the work device 2C. As a result, at a time t18, the remaining capacity of the storage battery unit 24 of the work device 2C becomes less than the first threshold value E1 (i.e., the work device 2C enters the second state). Then, the charging control unit 32 outputs the charging start instruction to the work device 2C. In response, the work device 2C moves to the charging area A2 and starts charging. Thereafter, when the remaining capacity of the storage battery unit 24 of the work device 2C becomes equal to or greater than the third threshold value E3 at a time t19, the work device 2C finishes charging the storage battery unit 24 thereof and becomes once again ready to perform the work (such as carrying work).

As can be seen from the foregoing description, the setting unit 31 sets a plurality of second threshold values E21, E22 as the threshold value. This enables more finely controlling, based on the remaining capacity of the storage battery unit 24 included in each of the plurality of work devices 2, the work of charging the storage battery unit 24 included in each of the plurality of work devices 2.

(3.3) Second Variation

Next, a charging control system 1 according to a second variation will be described with reference to FIG. 7. In the charging control system 1 according to the second variation, the setting unit 31 sets, as the third threshold value, a first end decision threshold value E31 and a second end decision threshold value E32, which is a major difference from the exemplary embodiment and first variation described above. In the charging control system 1 according to the second variation, the number of the work devices 2 for use in the working area A1 is two and the number of chargeable devices is one. The setting unit 31 sets a single threshold value as the first threshold value E1, a single threshold value as the second threshold value E2, and the first end decision threshold value E31 and the second end decision threshold value E32 as the third threshold values. Note that the charging control system 1 according to the second variation has the same configuration as the charging control system 1 of the embodiment described above. Thus, any constituent element of the second variation, having the same function as a counterpart of the embodiment described above, will be designated by the same reference numeral as that counterpart's, and description thereof will be omitted herein.

The first end decision threshold value E31 is a threshold value applicable to a situation where while the work device 2 designated as the target of control 2X is being charged, no work devices, other than the work device 2 designated as the target of control 2X, have the storage battery unit 24, of which the remaining capacity is less than the second threshold value E2. In other words, the first end decision threshold value E31 is a threshold value applicable to a situation where while the work device 2 designated as the target of control 2X is being charged, there are no work devices 2, of which the storage battery unit 24 has the remaining capacity that has decreased to so low a level as requiring charging (when either the first state or the second state is established). The first end decision threshold value E31 may be set at, for example, 90%.

The second end decision threshold value E32 is a threshold value applicable to a situation where while the work device 2 designated as the target of control 2X is being charged, some work devices, other than the work device 2 designated as the target of control 2X, have the storage battery unit 24, of which the remaining capacity is less than the second threshold value E2. This second end decision threshold value E32 is lower than the first end decision threshold value E31. In other words, the second end decision threshold value E32 is a threshold value applicable to a situation where there are some work devices 2, of which the storage battery unit 24 has the remaining capacity that has decreased to so low a level as requiring charging (when either the first state or the second state is established). The second end decision threshold value E32 may be set at a value (of 50%, for example) lower than the first end decision threshold value E31.

As can be seen, the third threshold value for use to determine whether or not to finish charging includes the first end decision threshold value E31 applicable to a situation where no other work devices 2 are waiting to be charged and the second end decision threshold value E32 applicable to a situation where some work devices 2 are waiting to be charged. The second end decision threshold value E32 is set at a value lower than the first end decision threshold value E31. This enables, when some work devices 2 are waiting to be charged, finishing charging the work device 2 designated as the target of control 2X being charged earlier than in a situation where no work devices 2 are waiting to be charged. This may reduce the chances of the work devices 2 waiting to be charged failing to be charged in time and running out of their battery. In addition, if there are no other work devices 2 waiting to be charged, then the work device 2 designated as the target of control 2X will be charged until the remaining capacity of the storage battery unit 24 thereof reaches the first end decision threshold value E31. This allows the work device 2 designated as the target of control 2X being charged to be charged sufficiently.

Next, it will be described with reference to FIG. 7 how the charging control unit 32 according to the second variation operates. FIG. 7 schematically shows a variation with time in the remaining capacity of the storage battery unit 24 included in each of the two work devices 2A, 2B. In FIG. 7, the line L1 indicates the variation with time in the remaining capacity of the storage battery unit 24 included in the work device 2A, while the line L2 indicates the variation with time in the remaining capacity of the storage battery unit 24 included in the work device 2B.

Figure 7:
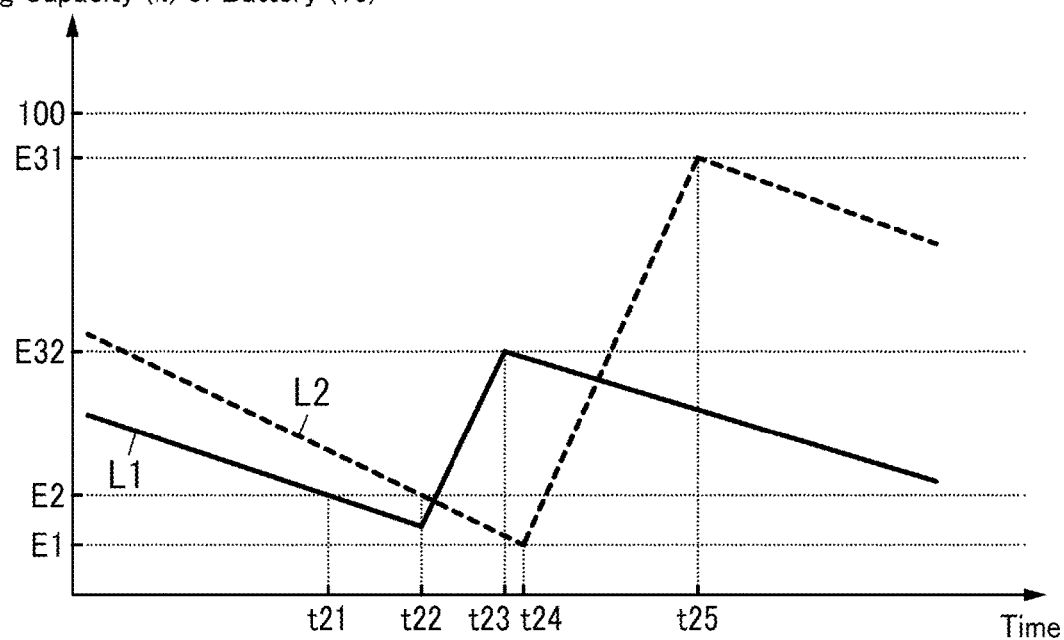
FIG. 7 is a graph showing how the remaining capacities of respective storage battery units included in work devices designated as targets of control for a charging control system according to a second variation change with time.

In the example illustrated in FIG. 7, before a time t21, the remaining capacity of the storage battery unit 24 is equal to or greater than the second threshold value E2 in each of the work devices 2A, 2B, and therefore, the charging control unit 32 does not output the charging start instruction to any of the work devices 2A, 2B.

If the remaining capacity of the storage battery unit 24 decreases with time in each of the work devices 2A, 2B to make the remaining capacity of the storage battery unit 24 of the work device 2A less than the second threshold value E2 but equal to or greater than the first threshold value E1 at the time t21 (i.e., when the work device 2A enters the first state), then the charging control unit 32 determines whether or not the decision condition is satisfied. In the period from the time t21 to before a time t22, the remaining capacity of the storage battery unit 24 of the work device 2B is equal to or greater than the second threshold value E2. Thus, the charging control unit 32 decides that the decision condition not be satisfied, and therefore, does not output the charging start instruction to the work device 2A. At the time t22, the remaining capacity of the storage battery unit 24 of the work device 2B also becomes less than the second threshold value E2. Then, the number of the work devices 2 in the first state becomes two. Thus, the charging control unit 32 decides that the decision condition be satisfied and outputs the charging start instruction to the work device 2A with the smaller remaining capacity. In response, the work device 2A moves to the charging area A2 and starts charging. As a result, the remaining capacity of the storage battery unit 24 of the work device 2A increases. On the other hand, the work device 2B is not performing the charging work, and therefore, the remaining capacity of the storage battery unit 24 of the work device 2B continues to decrease.

Thereafter, when the remaining capacity of the storage battery unit 24 of the work device 2A becomes equal to or greater than the second end decision threshold value E32 at a time t23 while the remaining capacity of the storage battery unit 24 of the work device 2B is less than the second threshold value E2, the charging control unit 32 outputs the charging end instruction to the work device 2A. When the work device 2A receives the charging end instruction, the work device 2A finishes charging the storage battery unit 24 thereof and becomes once again ready to perform the work (such as carrying work).

After that, the remaining capacity of the storage battery unit 24 continues to decrease in the work device 2B. As a result, at a time t24, the remaining capacity of the storage battery unit 24 of the work device 2B becomes less than the first threshold value E1 (i.e., the work device 2B enters the second state). Then, the charging control unit 32 outputs the charging start instruction to the work device 2B. In response, the work device 2B moves to the charging area A2 and starts charging. In the period from the time t24 through a time t25, the remaining capacity of the storage battery unit 24 of the work device 2A is greater than the second threshold value E2 and there are no other work devices 2 waiting to be charged. Thus, the charging control unit 32 continues to charge the work device 2B until the remaining capacity of the storage battery unit 24 thereof becomes equal to or greater than the first end decision threshold value E31. Thereafter, when the remaining capacity of the storage battery unit 24 of the work device 2B becomes equal to or greater than the first end decision threshold value E31 at the time t25, the charging control unit 32 outputs the charging end instruction to the work device 2B. When the work device 2B receives the charging end instruction, the work device 2B finishes charging the storage battery unit 24 thereof and becomes once again ready to perform the work (such as carrying work).

(3.3) Third Variation

Next, a charging control system 1 according to a third variation will be described with reference to FIG. 8. In the charging control system 1 according to the third variation, the setting unit 31 sets, as the threshold value, a plurality of second threshold values (such as two second threshold values E21, E22). In addition, the setting unit 31 further sets a plurality of second end decision threshold values (such as two second end decision threshold values E321, E322) corresponding one to one to the plurality of second threshold values (second threshold values E21, E22). The setting unit 31 sets each of the plurality of second end decision threshold values (such as the second end decision threshold values E321, E322) at a value that increases as the value of its corresponding second threshold value (such as the second threshold values E21, E22) increases. For example, the second threshold value E21 may be set at 20%, the second threshold value E22 may be set at 30%, the second end decision threshold value E321 corresponding to the second threshold value E21 may be set at 50%, and the second end decision threshold value E322 corresponding to the second threshold value E22 may be set at 70%. In the charging control system 1 according to the third variation, the number of the work devices 2 for use in the working area A1 is three and the number of chargeable devices is one. Note that the charging control system 1 according to the third variation has the same configuration as the charging control system 1 of the embodiment described above. Thus, any constituent element of the third variation, having the same function as a counterpart of the embodiment described above, will be designated by the same reference numeral as that counterpart's, and description thereof will be omitted herein.

Next, it will be described with reference to FIG. 8 how the charging control system 1 according to the third variation operates. FIG. 8 shows a variation with time in the remaining capacity of the storage battery unit 24 included in each of the three work devices 2A, 2B, 2C. In FIG. 8, the line L11 indicates the variation with time in the remaining capacity of the storage battery unit 24 included in the work device 2A, the line L12 indicates the variation with time in the remaining capacity of the storage battery unit 24 included in the work device 2B, and the line L13 indicates the variation with time in the remaining capacity of the storage battery unit 24 included in the work device 2C.

Figure 8:
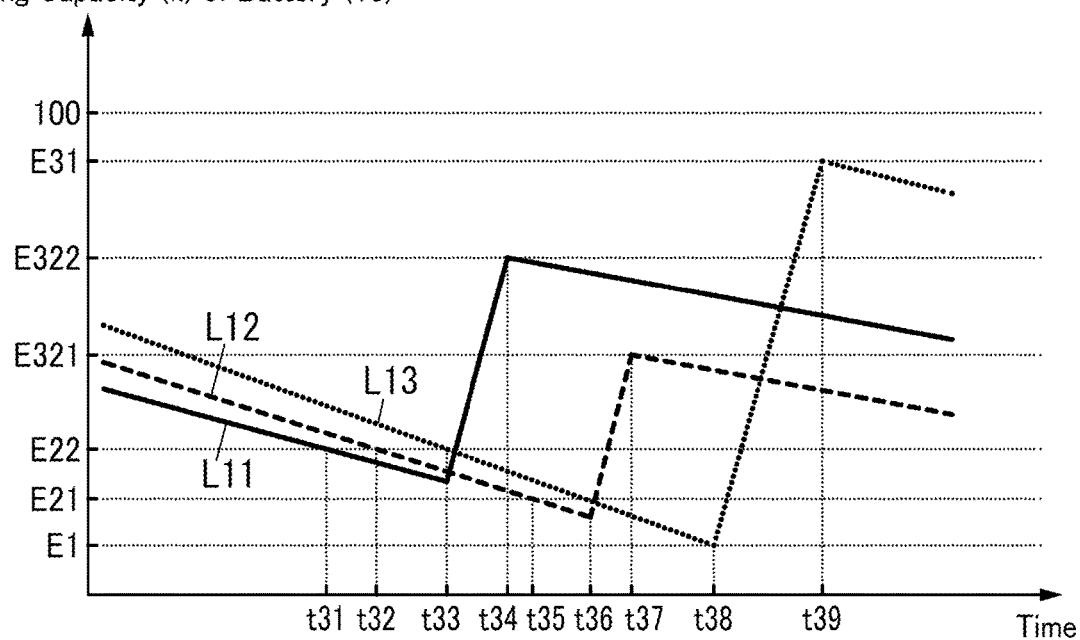
FIG. 8 is a graph showing how the remaining capacities of respective storage battery units included in work devices designated as targets of control for a charging control system according to a third variation change with time.

In the example illustrated in FIG. 8, before a time t31, the remaining capacity of the storage battery unit 24 is equal to or greater than the larger second threshold value E22 in each of the work devices 2A, 2B, 2C. Thus, the charging control unit 32 does not output the charging start instruction to any of the work devices 2A, 2B, 2C.

If the remaining capacity of the storage battery unit 24 decreases with time in each of the work devices 2A, 2B, 2C to make the remaining capacity of the storage battery unit 24 of the work device 2A less than the second threshold value E22 but equal to or greater than the first threshold value E1 at the time t31, then the charging control unit 32 determines whether or not the decision condition is satisfied. In the third variation, the decision condition used by the charging control unit 32 includes two conditions, which will be hereinafter referred to as a first condition and a second condition, respectively. Specifically, the first condition is that the number of the work devices 2, of which the storage battery unit 24 has come to have a remaining capacity less than the second threshold value E22, be more than twice as large as the number of the work devices 2 that can be charged by the charger 4 (hereinafter referred to as "the number of chargeable devices"). The second condition is that the number of the work devices 2, of which the storage battery unit 24 has come to have a remaining capacity less than the second threshold value E21, is larger than the number of the work devices 2 that can be charged by the charger 4.

At a time t32, the work device 2B also enters the first state. In the period from the time t31 to before a time t33, the remaining capacity of the storage battery unit 24 of the work device 2C is equal to or greater than the second threshold value E22. Thus, the charging control unit 32 decides that neither the first condition nor the second condition be satisfied and does not output the charging start instruction to any of the work devices 2A-2C.

After a time t33 is passed, the remaining capacity of the storage battery unit 24 of the work device 2C also becomes less than the second threshold value E22, and therefore, the number of the work devices 2, of which the storage battery unit 24 has come to have a remaining capacity less than the second threshold value E22, becomes three, which is more than twice as large as the number of chargeable devices. At this time, the charging control unit 32 decides that the first condition be satisfied and outputs the charging start instruction to the work device 2A with the smaller remaining capacity. In response, the work device 2A moves to the charging area A2 and starts charging. As a result, the remaining capacity of the storage battery unit 24 of the work device 2A increases. On the other hand, the work devices 2B, 2C are not performing charging work, and therefore, the remaining capacity of the storage battery unit 24 of the work devices 2B, 2C continues to decrease. Thereafter, when the remaining capacity of the storage battery unit 24 of the work device 2A becomes equal to or greater than the second end decision threshold value E322 corresponding to the second threshold value E22 at a time t34, the charging control unit 32 outputs a charging end instruction to the work device 2A. When receiving the charging end instruction, the work device 2A finishes charging the storage battery unit 24 thereof and becomes once again ready to perform the work (such as carrying work).

After that, the remaining capacity of the storage battery unit 24 continues to decrease in the work devices 2B, 2C. As a result, at a time t35, the remaining capacity of the storage battery unit 24 of the work device 2B becomes less than the second threshold value E21. Meanwhile, the remaining capacity of the storage battery unit 24 of the work device 2C is equal to or greater than the second threshold value E21. Thus, the charging control unit 32 decides that the second condition not be satisfied. Thereafter, at a time t36, the remaining capacity of the storage battery unit 24 of the work device 2C also becomes less than the second threshold value E21. Then, the charging control unit 32 decides that the second condition be satisfied and outputs the charging start instruction to the work device 2B with the smaller remaining capacity. In response, the work device 2B moves to the charging area A2 and starts charging. As a result, the remaining capacity of the storage battery unit 24 of the work device 2B increases. On the other hand, the work device 2C is not performing charging work, and therefore, the remaining capacity of the storage battery unit 24 of the work device 2C continues to decrease. Thereafter, when the remaining capacity of the storage battery unit 24 of the work device 2B reaches, at a time t37, the second end decision threshold value E321 corresponding to the second threshold value E21, the charging control unit 32 outputs a charging end instruction to the work device 2B. When receiving the charging end instruction, the work device 2B finishes charging the storage battery unit 24 thereof and becomes once again ready to perform the work (such as carrying work).

After that, the remaining capacity of the storage battery unit 24 continues to decrease in the work device 2C. As a result, at a time t38, the remaining capacity of the storage battery unit 24 of the work device 2C becomes less than the first threshold value E1 (i.e., the work device 2C enters the second state). Then, the charging control unit 32 outputs the charging start instruction to the work device 2C. In response, the work device 2C moves to the charging area A2 and starts charging. In the period from the time t38 through a time t39, the remaining capacity of the storage battery unit 24 is equal to or greater than the second threshold value E22 in each of the work devices 2A, 2B and there are no other work devices 2 waiting to be charged. Thus, the charging control unit 32 continues to charge the work device 2C until the remaining capacity of the storage battery unit 24 thereof becomes equal to or greater than the second end decision threshold value E321. Thereafter, when the remaining capacity of the storage battery unit 24 of the work device 2C becomes equal to or greater than the first end decision threshold value E31 at the time t39, the charging control unit 32 outputs a charging end instruction to the work device 2C. When receiving the charging end instruction, the work device 2C finishes charging the storage battery unit 24 thereof and becomes once again ready to perform the work (such as carrying work).

According to the third variation, the setting unit 31 sets a plurality of second end decision threshold values E321, E322 corresponding one to one to the plurality of second threshold values E21, E22, respectively. The setting unit 31 sets each of the plurality of second end decision threshold values (second end decision threshold values E321, E322) at a value that increases as the value of its corresponding second threshold value (second threshold value E21, E22) increases. That is to say, since the second threshold value E22 is larger than the second threshold value E21, the second end decision threshold value E322 corresponding to the second threshold value E22 is a set at a value larger than the second end decision threshold value E321 corresponding to the second threshold value E21. Thus, if charging has been started in response to a decrease in the remaining capacity of the storage battery unit 24 to less than the second threshold value E22 (larger than the threshold value E21), the storage battery unit 24 is charged to the second end decision threshold value E322 larger than the second end decision threshold value E321, compared to the situation where charging has been started in response to a decrease in the remaining capacity to less than the second threshold value E21. Therefore, a work device 2 that has started to be charged at an earlier timing will be charged to a higher battery level than a work device 2 that has started to be charged at a later timing. This allows the storage battery unit 24 to have its remaining capacity kept equal to or greater than the second threshold value E22 for a longer time before its remaining capacity decreases once again to less than the second threshold value E22 after the storage battery unit 24 has been charged once.

In the third variation, the setting unit 31 sets two second threshold values E21, E22 and also sets two end decision threshold values E321, E322 corresponding one to one to the second threshold values E21, E22, respectively. However, the number of the second threshold values and the number of the second end decision threshold values do not have to be two. Alternatively, the number of the second threshold values and the number of the second end decision threshold values may be changed as appropriate according to the number of the work devices 2 for use in the working area A1, the number of the work devices 2 that can be charged at a time by the charger 4, the volume of the work to be performed by the work devices 2, or any other parameter.

(3.4) Fourth Variation

In a charging control system 1 according to a fourth variation, the decision condition described above includes a condition that the current time fall within a low-task period in which the number of tasks of the work assigned to the plurality of work devices 2 is smaller than a predetermined reference level, which is a major difference from the exemplary embodiment and first to third variations described above. Note that the charging control system 1 according to the fourth variation has the same configuration as the charging control system 1 of the embodiment described above. Thus, any constituent element of the fourth variation, having the same function as a counterpart of the embodiment described above, will be designated by the same reference numeral as that counterpart's, and description thereof will be omitted herein.

Figure 9:
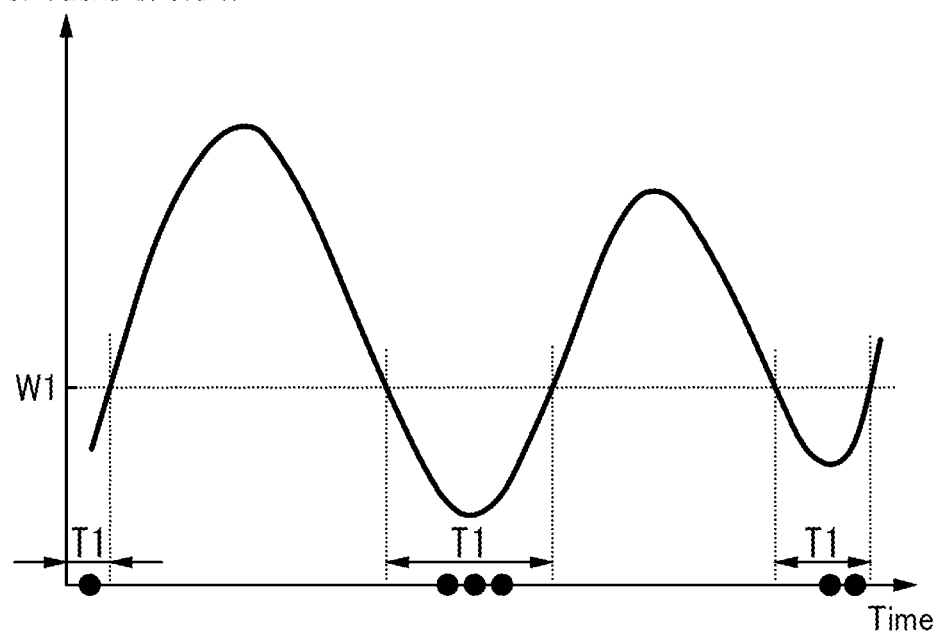
FIG. 9 is a graph showing how the number of tasks of the work performed by the work device changes with time.

FIG. 9 is a graph showing a variation with time in the number of tasks of the work assigned to the plurality of work devices 2. More specifically, the graph shown in FIG. 9 shows a variation with time in the number of tasks of the work that has been performed by the plurality of work devices 2 during a predetermined reckoning period. The setting unit 31 estimates, based on a variation with time in the number of tasks that have been actually performed during the predetermined reckoning period, a low-task period T1 in which the number of tasks is smaller than a reference level W1 per unit period (such as one day, one week, or one month), thus setting the low-task period T1 during the unit period.

The charging control unit 32 determines, when finding the remaining capacity of the storage battery unit 24 included in the work device 2 designated as the target of control 2X equal to or greater than the first threshold value E1 but less than the second threshold value E2 (i.e., when the work device 2 designated as the target of control 2X enters the first state), whether or not the current time falls within the low-task period T1. When finding the current time falling outside of the low-task period T1, the charging control unit 32 does not output the charging start instruction to the work device 2 designated as the target of control 2X. On the other hand, when finding the current time falling within the low-task period T1, the charging control unit 32 outputs the charging start instruction to the work device 2 designated as the target of control 2X.

As can be seen, when the work device 2 enters the first state during the low-task period T1, the charging control unit 32 outputs the charging start instruction to the work device 2 designated as the target of control 2X, thus allowing the work device 2 to be charged by using the low-task period T1 in which the number of the tasks is relatively small. This reduces the chances of the work devices 2 being charged in a period other than the low-task period T1. In other words, this may increase the number of the work devices 2 that are ready to perform the work in a period other than the low-task period T1. Consequently, this enables more work to be done by the plurality of work devices 2.

Optionally, in the exemplary embodiment and first to third variations described above, in a period other than the low-task period T1 in which the number of tasks of the work assigned to the plurality of work devices 2 is smaller than the predetermined reference level W1, the charging control unit 32 may suspend outputting the charging start instruction to the work device 2 designated as the target of control 2X.

In that case, the charging control unit 32 outputs the charging start instruction only in the low-task period T1. This reduces the chances of the charging start instruction being output in such a period in which the number of tasks is equal to or greater than the reference level W1. Consequently, this enables more work to be done by the plurality of work devices 2.

(Recapitulation)

As can be seen from the foregoing description, a charging control method according to a first aspect includes setting processing and charging control processing. The setting processing includes setting at least a first threshold value (E1) and a second threshold value (E2) as threshold values with respect to a remaining capacity of a storage battery unit (24) included in each of a plurality of work devices (2). The second threshold value (E2) is larger than the first threshold value (E1). The charging control processing includes designating one of the plurality of work devices (2) as a target of control (2X) and controlling, based on the remaining capacity of the storage battery unit (24) included in the work device (2) designated as the target of control (2X), charging of the storage battery unit (24). The charging control processing includes outputting, in a first state (S1) where the remaining capacity of the storage battery unit (24) included in the work device (2) designated as the target of control (2X) is equal to or greater than the first threshold value (E1) but less than the second threshold value (E2), a charging start instruction to the work device (2) designated as the target of control (2X) when a predetermined decision condition is satisfied. The charging start instruction is output to instruct the work device (2) designated as the target of control (2X) to start charging. The charging control processing further includes outputting, in a second state (S2) where the remaining capacity of the storage battery unit (24) included in the work device (2) designated as the target of control (2X) is less than the first threshold value (E1), the charging start instruction to the work device (2) designated as the target of control (2X), no matter whether the predetermined decision condition is satisfied or not.

According to this aspect, the charging control processing includes outputting, if the predetermined decision condition is satisfied in the first state (S1), a charging start instruction to the work device (2) designated as the target of control (2X). This allows the storage battery unit (24) to be charged at a point in time before the remaining capacity of the storage battery unit (24) decreases to less than the first threshold value (E1). Thus, this aspect provides a charging control method that may reduce the chances of the remaining capacities of the respective storage battery units (24) of a plurality of work devices (2) decreasing at a time to less than the first threshold value (E1) and thereby reduce the chances of the remaining capacity of the storage battery unit (24) becoming too low to have the specified work done.

In a charging control method according to a second aspect, which may be implemented in conjunction with the first aspect, the predetermined decision condition includes a condition based on a numerical number of tasks of work assigned to the plurality of work devices (2).

This aspect enables outputting the charging start instruction when a condition based on the number of tasks of the work is satisfied in the first state.

In a charging control method according to a third aspect, which may be implemented in conjunction with the first or second aspect, the setting processing includes providing a hysteresis between the threshold value (E1a, E2a) in a discharged state where the storage battery unit (24) has discharged and the threshold value (E1b, E2b) in a charging state where the storage battery unit (24) is being charged.

This aspect may reduce the chances of the state hunting between the first state and the second state when the remaining capacity of the storage battery unit (24) varies in the vicinity of the threshold value (E1a, E1b, E2a, E2b).

In a charging control method according to a fourth aspect, which may be implemented in conjunction with any one of the first to third aspects, the predetermined decision condition includes a condition based on the remaining capacity of the storage battery unit (24) included in one or more work devices (2), other than the work device (2) designated as the target of control (2X), out of the plurality of work devices (2).

This aspect enables outputting the charging start instruction when a condition based on the remaining capacity of the storage battery unit (24) included in one or more work devices (2) other than the work device (2) designated as the target of control (2X) is satisfied.

In a charging control method according to a fifth aspect, which may be implemented in conjunction with any one of the first to fourth aspects, the setting processing includes setting a plurality of second threshold values (E21, E22), including the second threshold value (E2), as the threshold values.

This aspect enables determining whether or not the decision condition is satisfied when the remaining capacity is less than each of the plurality of second threshold values (E21, E22).

In a charging control method according to a sixth aspect, which may be implemented in conjunction with any one of the first to fifth aspects, the setting processing includes further setting a third threshold value (E3) as another one of the threshold values. The charging control method further includes charging end processing. The charging end processing includes outputting, when the remaining capacity of the storage battery unit (24) included in the work device (2) designated as the target of control (2X) becomes equal to or greater than the third threshold value (E3) while the work device (2) designated as the target of control (2X) is being charged, a charging end instruction to the work device (2) designated as the target of control (2X). The charging end instruction is output to instruct the work device (2) designated as the target of control (2X) to finish charging.

This aspect enables outputting, when the work device (2) designated as the target of control (2X) is charged to the point that the remaining capacity of the storage battery unit (24) thereof becomes equal to or greater than the third threshold value (E3), a charging end instruction to the work device (2) designated as the target of control (2X).

In a charging control method according to a seventh aspect, which may be implemented in conjunction with the sixth aspect, the third threshold value (E3) includes a first end decision threshold value (E31) and a second end decision threshold value (E32). The first end decision threshold value (E31) is a threshold value applicable to a situation where no work devices (2) other than the work device (2) designated as the target of control (2X) have the storage battery unit (24), of which the remaining capacity is less than the second threshold value (E2), while the work device (2) designated as the target of control (2X) is being charged. The second end decision threshold value (E32) is a threshold value applicable to a situation where some work devices (2) other than the work device (2) designated as the target of control (2X) have the storage battery unit (24), of which the remaining capacity is less than the second threshold value (E2), while the work device (2) designated as the target of control (2X) is being charged. The second end decision threshold value (E32) is lower than the first end decision threshold value (E31).

This aspect enables, in a situation where any work device (2) is waiting for its turn to be charged, finishing charging the work device (2) being charged earlier than in a situation where no work device (2) is waiting for its turn to be charged.

In a charging control method according to an eighth aspect, which may be implemented in conjunction with the seventh aspect, the setting processing includes setting a plurality of second threshold values (E21, E22), including the second threshold value (E2), as the threshold values. The setting processing includes further setting a plurality of second end decision threshold values (E321, E322) including the second end decision threshold value (E32) and corresponding one to one to the plurality of second threshold values (E21, E22). The setting processing includes setting each of the plurality of second end decision threshold values (E321, E322) at a value that increases as a corresponding one of the plurality of second threshold values (E21, E22) increases.

This aspect allows, if the storage battery unit (24) has started to be charged as its remaining capacity has decreased to less than the second threshold value (E22) that is higher than the second threshold value (E21), the storage battery unit (24) to be charged to the second end decision threshold value (E322) that is higher than the second end decision threshold value (E321), compared to a situation where the storage battery unit (24) has started to be charged as its remaining capacity has decreased to less than the second threshold value (E21) that is lower than the second threshold value (E22). Thus, the work device (2) that has started to be charged at the earlier timing will be charged to a higher battery level than the work device (2) that has started to be charged at the later timing. This allows the storage battery unit (24) to have its remaining capacity kept equal to or greater than the second threshold value (E22) for a longer time before its remaining capacity decreases once again to less than the second threshold value (E22) after the storage battery unit (24) has been charged once.

In a charging control method according to a ninth aspect, which may be implemented in conjunction with any one of the first to eighth aspects, the predetermined decision condition includes a condition that a current point in time fall within a low-task period (T1) in which a numerical number of tasks of work assigned to the plurality of work devices (2) is smaller than a predetermined reference level (W1).

This aspect enables outputting the charging start instruction when the condition that the current point in time fall within the low-task period (T1) is satisfied.

In a charging control method according to a tenth aspect, which may be implemented in conjunction with any one of the first to ninth aspects, the charging control processing includes stopping outputting the charging start instruction to the work device (2) designated as the target of control (2X) in every period but a low-task period (T1). The low-task period (T1) is a period in which a numerical number of tasks of work assigned to the plurality of work devices (2) is smaller than a predetermined reference level (W1).

According to this aspect, outputting the charging start instruction is stopped in every period but the low-task period (T1), thus enabling giving a higher priority to the work to be done rather than charging.

In a charging control method according to an eleventh aspect, which may be implemented in conjunction with any one of the first to tenth aspects, work to be performed by the plurality of work devices (2) is carrying a burden.

This aspect provides a charging control method that may reduce the chances of the storage battery unit (24) of the work device (2) in charge of carrying the burden coming to have too low a remaining capacity for the work device (2) to perform the specified work.

A program according to a twelfth aspect is designed to cause a computer system to perform the charging control method according to any one of the first to eleventh aspects.

This aspect provides a program that may reduce the chances of the storage battery unit (24) coming to have too low a remaining capacity to have the specified work done.

A charging control system (1) according to a thirteenth aspect includes a setting unit (31) and a charging control unit (32). The setting unit (31) sets at least a first threshold value (E1) and a second threshold value (E2) as threshold values with respect to a remaining capacity of a storage battery unit (24) included in each of a plurality of work devices (2). The second threshold value (E2) is larger than the first threshold value (E1). The charging control unit (32) designates one of the plurality of work devices (2) as a target of control (2X) and controls, based on the remaining capacity of the storage battery unit (24) included in the work device (2) designated as the target of control (2X), charging of the storage battery unit (24). The charging control unit (32) outputs, in a first state (S1), a charging start instruction to the work device (2) designated as the target of control (2X) when a predetermined decision condition is satisfied. The charging start instruction is output to instruct the work device (2) designated as the target of control (2X) to start charging. The first state (S1) is a state where the remaining capacity of the storage battery unit (24) included in the work device (2) designated as the target of control (2X) is equal to or greater than the first threshold value (E1) but less than the second threshold value (E2). The charging control unit (32) further outputs, in a second state (S2) where the remaining capacity of the storage battery unit (24) included in the work device (2) designated as the target of control (2X) is less than the first threshold value (E1), the charging start instruction to the work device (2) designated as the target of control (2X), no matter whether the predetermined decision condition is satisfied or not.

This aspect provides a charging control system (1) that may reduce the chances of the storage battery unit (24) coming to have too low a remaining capacity to have the specified work done.

Note that these are only exemplary aspects of the present disclosure. Rather, various configurations of the charging control system (1) according to the exemplary embodiment described above (including its variations) are also implementable as a charging control method, a (computer) program, or a non-transitory storage medium on which the program is stored.

Also, the features according to the second to eleventh aspects are not essential features for the charging control method but may be omitted as appropriate.

REFERENCE SIGNS LIST

1 Charging Control System
2 Work Device
2X Target of Control
24 Storage Battery Unit
31 Setting Unit
32 Charging Control Unit
E1, E1a, E1b First Threshold Value
E2, E2a, E2b, E21, E22 Second Threshold Value
E3 Third Threshold Value
E31 First End Decision Threshold Value
E32, E321, E322 Second End Decision Threshold Value
S1 First State
S2 Second State
T1 Low-Task Period
W1 Reference Level

The invention claimed is:

1. A charging control method comprising:
setting processing including setting at least a first threshold value and a second threshold value as threshold values with respect to a remaining capacity of a storage battery unit included in each of a plurality of work devices, the second threshold value being larger than the first threshold value; and
charging control processing including designating one of the plurality of work devices as a target of control and controlling, based on the remaining capacity of the storage battery unit included in the work device designated as the target of control, charging of the storage battery unit,
the charging control processing including outputting, in a first state where the remaining capacity of the storage battery unit included in the work device designated as the target of control is equal to or greater than the first threshold value but less than the second threshold value, a charging start instruction to the work device designated as the target of control when a predetermined decision condition is satisfied, the charging start instruction being output to instruct the work device designated as the target of control to start charging,
the charging control processing further including outputting, in a second state where the remaining capacity of the storage battery unit included in the work device designated as the target of control is less than the first threshold value, the charging start instruction to the work device designated as the target of control, no matter whether the predetermined decision condition is satisfied or not,
the setting processing including further setting a third threshold value as another one of the threshold values,
the charging control method further comprising charging end processing including outputting, when the remaining capacity of the storage battery unit included in the work device designated as the target of control becomes equal to or greater than the third threshold value while the work device designated as the target of control is being charged, a charging end instruction to the work device designated as the target of control, the charging end instruction being output to instruct the work device designated as the target of control to finish charging,
the third threshold value including a first end decision threshold value and a second end decision threshold value,
the first end decision threshold value being a threshold value applicable to a situation where no work devices other than the work device designated as the target of control have the storage battery unit, of which the remaining capacity is less than the second threshold value, while the work device designated as the target of control is being charged,
the second end decision threshold value being a threshold value applicable to a situation where some work devices other than the work device designated as the target of control have the storage battery unit, of which the remaining capacity is less than the second threshold value, while the work device designated as the target of control is being charged,
the second end decision threshold value being lower than the first end decision threshold value,
the setting processing including setting a plurality of second threshold values, including the second threshold value, as the threshold values,
each of the plurality of second threshold values being larger than the first threshold value,
the setting processing including further setting a plurality of second end decision threshold values including the second end decision threshold value and corresponding one to one to the plurality of second threshold values, and
the setting processing including setting each of the plurality of second end decision threshold values at a value that increases as a corresponding one of the plurality of second threshold values increases.

2. The charging control method of claim 1, wherein
the predetermined decision condition includes a condition based on a numerical number of tasks of work assigned to the plurality of work devices.

3. The charging control method of claim 2, wherein
the setting processing includes providing a hysteresis between the threshold values including the first threshold value and the second threshold value in a discharged state where the storage battery unit has discharged and the third threshold value in a charging state where the storage battery unit is being charged.

4. The charging control method of claim 2, wherein
the predetermined decision condition includes a condition based on the remaining capacity of the storage battery unit included in one or more work devices, other than the work device designated as the target of control, out of the plurality of work devices.

5. The charging control method of claim 1, wherein
the setting processing includes providing a hysteresis between the threshold values including the first threshold value and the second threshold value in a discharged state where the storage battery unit has discharged and the third threshold value in a charging state where the storage battery unit is being charged.

6. The charging control method of claim 5, wherein
the predetermined decision condition includes a condition based on the remaining capacity of the storage battery unit included in one or more work devices, other than the work device designated as the target of control, out of the plurality of work devices.

7. The charging control method of claim 1, wherein
the predetermined decision condition includes a condition based on the remaining capacity of the storage battery unit included in one or more work devices, other than the work device designated as the target of control, out of the plurality of work devices.

8. The charging control method of claim 1, wherein
the predetermined decision condition includes a condition that a current point in time fall within a low-task period in which a numerical number of tasks of work assigned to the plurality of work devices is smaller than a predetermined reference level.

9. The charging control method of claim 1, wherein the charging control processing includes stopping outputting the charging start instruction to the work device designated as the target of control in every period but a low-task period in which a numerical number of tasks of work assigned to the plurality of work devices is smaller than a predetermined reference level.

10. The charging control method of claim 1, wherein work to be performed by the plurality of work devices is carrying a burden.

11. A non-transitory storage medium comprising computer executable instructions, which when executed by a computer system, instructs the computer system to perform the charging control method of claim 1.

12. A charging control system comprising:
a setting unit configured to set at least a first threshold value and a second threshold value as threshold values with respect to a remaining capacity of a storage battery unit included in each of a plurality of work devices, the second threshold value being larger than the first threshold value; and
a charging control unit configured to designate one of the plurality of work devices as a target of control and control, based on the remaining capacity of the storage battery unit included in the work device designated as the target of control, charging of the storage battery unit,
the charging control unit being configured to output, in a first state where the remaining capacity of the storage battery unit included in the work device designated as the target of control is equal to or greater than the first threshold value but less than the second threshold value, a charging start instruction to the work device designated as the target of control when a predetermined decision condition is satisfied, the charging start instruction being output to instruct the work device designated as the target of control to start charging,
the charging control unit being further configured to output, in a second state where the remaining capacity of the storage battery unit included in the work device designated as the target of control is less than the first threshold value, the charging start instruction to the work device designated as the target of control, no matter whether the predetermined decision condition is satisfied or not,
the setting unit being further configured to further set a third threshold value as another one of the threshold values,
the charging control unit being configured to perform charging end process including outputting, when the remaining capacity of the storage battery unit included in the work device designated as the target of control becomes equal to or greater than the third threshold value while the work device designated as the target of control is being charged, a charging end instruction to the work device designated as the target of control, the charging end instruction being output to instruct the work device designated as the target of control to finish charging,
the third threshold value including a first end decision threshold value and a second end decision threshold value,
the first end decision threshold value being a threshold value applicable to a situation where no work devices other than the work device designated as the target of control have the storage battery unit, of which the remaining capacity is less than the second threshold value, while the work device designated as the target of control is being charged,
the second end decision threshold value being a threshold value applicable to a situation where some work devices other than the work device designated as the target of control have the storage battery unit, of which the remaining capacity is less than the second threshold value, while the work device designated as the target of control is being charged,
the second end decision threshold value being lower than the first end decision threshold value,
the setting unit being configured to set a plurality of second threshold values, including the second threshold value, as the threshold values,
each of the plurality of second threshold values being larger than the first threshold value,
the setting unit being further configured to set a plurality of second end decision threshold values including the second end decision threshold value and corresponding one to one to the plurality of second threshold values, and
the setting unit being configured to set each of the plurality of second end decision threshold values at a value that increases as a corresponding one of the plurality of second threshold values increases.

* * * * *